United States Patent
Huang et al.

(10) Patent No.: US 10,880,773 B2
(45) Date of Patent: Dec. 29, 2020

(54) WIRELESS COMMUNICATION METHOD AND APPARATUS

(71) Applicant: HUAWEI TECHNOLOGIES CO., LTD., Guangdong (CN)

(72) Inventors: Qufang Huang, Shanghai (CN); Mingzeng Dai, Shanghai (CN); Lifeng Han, Shanghai (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/277,368

(22) Filed: Feb. 15, 2019

(65) Prior Publication Data

US 2019/0182703 A1 Jun. 13, 2019

Related U.S. Application Data

(63) Continuation of application No. PCT/CN2017/096215, filed on Aug. 7, 2017.

(30) Foreign Application Priority Data

Aug. 15, 2016 (CN) .......................... 2016 1 0673593

(51) Int. Cl.
*H04W 28/02* (2009.01)
*H04W 76/12* (2018.01)
(Continued)

(52) U.S. Cl.
CPC ....... *H04W 28/0263* (2013.01); *H04W 24/10* (2013.01); *H04W 28/02* (2013.01);
(Continued)

(58) Field of Classification Search
None
See application file for complete search history.

(56) References Cited

U.S. PATENT DOCUMENTS

2006/0030342 A1* 2/2006 Hwang ................. H04N 21/21
455/466
2010/0020816 A1* 1/2010 Gulati ..................... H04L 12/56
370/412
(Continued)

FOREIGN PATENT DOCUMENTS

CN 101754373 A 6/2010
CN 102892143 A 1/2013
(Continued)

OTHER PUBLICATIONS

CATT,"Handling of EPS bearers not been switched successfully in the EPC",3GPP TSG-SA WG2 Meeting #76 S2-096618,6—Nov. 20, 2009, San Jose Del Cabo, Mexico,Change Request 23.401 CR 1391,Current version:8.7.0,total 5 pages.
(Continued)

*Primary Examiner* — Bunjob Jaroenchonwanit
(74) *Attorney, Agent, or Firm* — James Anderson Harrison

(57) ABSTRACT

A data processing method and apparatus are disclosed, and the method includes: determining a radio bearer, RB, to which a first flow is mapped changing from a first RB to a second RB; and sending end indication information. Data packet disorder can be avoided by said method and apparatus.

13 Claims, 19 Drawing Sheets

(51) Int. Cl.
*H04W 76/11* (2018.01)
*H04W 24/10* (2009.01)
*H04W 80/08* (2009.01)

(52) U.S. Cl.
CPC ............ *H04W 76/11* (2018.02); *H04W 76/12* (2018.02); *H04W 80/08* (2013.01)

(56) References Cited

U.S. PATENT DOCUMENTS

| | | | |
|---|---|---|---|
| 2014/0133298 A1 | 5/2014 | Han et al. | |
| 2014/0362829 A1 | 12/2014 | Kazmi et al. | |
| 2015/0043442 A1* | 2/2015 | Wong | H04W 72/1263 370/329 |
| 2015/0071139 A1* | 3/2015 | Nix | H04L 9/0841 370/311 |
| 2015/0139192 A1* | 5/2015 | Zhang | H04W 36/04 370/331 |
| 2015/0237672 A1* | 8/2015 | Kanamarlapudi | H04L 1/1858 370/329 |
| 2015/0327094 A1 | 11/2015 | Lee et al. | |
| 2016/0345302 A1* | 11/2016 | Stattin | H04W 28/18 |
| 2017/0134236 A1* | 5/2017 | Patel | H04L 5/0044 |
| 2017/0250829 A1* | 8/2017 | Lu | H04L 41/0893 |
| 2017/0303287 A1* | 10/2017 | Yu | H04L 61/2007 |
| 2017/0339568 A1* | 11/2017 | Wang | H04W 16/14 |
| 2017/0353992 A1* | 12/2017 | Quan | H04W 76/10 |
| 2018/0027607 A1* | 1/2018 | Caverni | H04W 76/27 455/450 |
| 2018/0241653 A1* | 8/2018 | Pelletier | H04L 43/0811 |
| 2018/0343668 A1* | 11/2018 | Ogawa | H04L 5/0064 |
| 2019/0173673 A1* | 6/2019 | Nix | H04L 9/085 |
| 2019/0174377 A1* | 6/2019 | Decarreau | H04W 36/023 |
| 2019/0191345 A1* | 6/2019 | Yamada | H04W 36/0072 |
| 2019/0253918 A1* | 8/2019 | Liu | H04W 40/06 |
| 2019/0372984 A1* | 12/2019 | Faccin | H04L 63/102 |
| 2020/0008113 A1* | 1/2020 | Chen | H04W 12/001 |
| 2020/0037197 A1* | 1/2020 | Cho | H04W 28/0268 |
| 2020/0037334 A1* | 1/2020 | Pao | H04W 72/0413 |

FOREIGN PATENT DOCUMENTS

| | | |
|---|---|---|
| CN | 103118401 A | 5/2013 |
| CN | 103945470 A | 7/2014 |
| CN | 104904254 A | 9/2015 |
| EP | 3043595 A1 | 7/2016 |
| WO | 2008020788 A1 | 2/2008 |

OTHER PUBLICATIONS

ZTE,"Discussion on the QoS control in the NextGen RAN", TSG-RAN WG2 Meeting #93bis R2-162622,Dubrovnik, Croatia, Apr. 11-15, 2016,total 5 pages.

Ericsson,"QoS framework for NR",3GPP TSG-RAN WG2 Meeting #96 Tdoc R2-168657,Reno, Nevada, USA, Nov. 14-18, 2016,total 6 pages.

Huawei, HiSilicon,"Considerations on 5G RAN QoS framework",3GPP TSG-RAN2 Meeting #94 R2-164267,Nanjing, China, May 23-27, 2016,total 2 pages.

ZTE, ZTE Microelectronics,"Further discussion on the new UP protocol layer for QoS",3GPP TSG-RAN WG2 Meeting ·97 R2-1701119,Athens, Greece, Feb. 13-17, 2017,total 7 pages.

CATT,"QoS framework impact on RAN",3GPP TSG RAN WG3 Meeting #93 Gothenburg, Sweden, Aug. 22-26, 2016,total 4 pages.

* cited by examiner

WIRELESS COMMUNICATION METHOD AND APPARATUS

CROSS-REFERENCE TO RELATED APPLICATIONS

This application is a continuation of International Application No. PCT/CN2017/096215, filed on Aug. 7, 2017, which claims priority to Chinese Patent Application No. 201610673593.7, filed on Aug. 15, 2016. The disclosures of the aforementioned applications are hereby incorporated by reference in their entireties.

TECHNICAL FIELD

This application relates to the field of mobile communications technologies, and in particular, to a data processing method and apparatus.

BACKGROUND

In an existing LTE (long term evolution) system, data transmission is performed in units of RBs (radio bearer), and in the LTE system, data is divided into one or more DRBs (data radio bearer) based on QoS (quality of service) requirements of various applications. Specifically, for downlink data, a PGW (public data network gateway) performs data filtering by using a TFT (traffic flow template) to map a data packet to each bearer. For uplink data, a terminal performs data filtering locally to map a data packet to each bearer. From a perspective of a RAN (radio access network), only one or more RBs can be identified, and different air interface processing parameters are configured for different RBs, thereby implementing different processing on data of the RBs. Same processing is performed on data of all DRBs on a radio access network device side, and different processing is performed on data of different DRBs on the radio access network device side.

In 5G (5th Generation) wireless communication systems being discussed, more refined QoS processing needs to be performed on service data, and a "flow" concept is introduced, that is, a data packet of one RB may be divided into data packets of a plurality of flows. Currently, there is no solution for implementing flow-level data packet processing.

SUMMARY

Embodiments of this application provide a wireless communication and data processing method and apparatus, so that a transmitter indicates a flow to which each data packet belongs to a receiver, thereby implementing flow-level data packet processing, and improving data packet processing efficiency.

According to a first aspect, an embodiment of this application provides a method, including:

determining, by a first device, a flow to which a data packet belongs; and determining, by the first device, a flow identifier based on the flow to which the data packet belongs, and sending the data packet including the flow identifier to a second device.

According to the method provided in this embodiment of this application, after determining the flow identifier of the data packet, the first device sends the flow identifier to a second device by using the data packet, to indicate the flow to which the data packet belongs to the second device. In this method, the second device can perform flow-level data packet processing, thereby further improving peer-to-peer QoS performance.

Optionally, the determining, by the first device, a flow identifier based on the flow to which the data packet belongs includes:

allocating, by the first device, the flow identifier to the data packet based on the flow to which the data packet belongs; or determining, by the first device from a flow identifier list sent by a third device, the flow identifier corresponding to the flow to which the data packet belongs.

According to the foregoing method, the first device directly allocates the flow identifier to the data packet, or the first device determines the flow identifier for the data packet based on the flow identifier list sent by the third device, thereby rapidly determining the flow identifier of the data packet, and improving efficiency of determining the flow identifier of the data packet.

Optionally, the flow identifier is located in a packet header of the data packet.

Optionally, the flow identifier is located in a data packet sequence number field of the data packet and occupies K bits in the data packet sequence number field, where K is a positive integer.

According to the foregoing method, the K bits in the data packet sequence number field are directly used to carry the flow identifier, and a flow to which each data packet belongs can be determined without changing an existing data packet structure.

Optionally, after the first device receives the data packet, the method further includes:

arranging, by the first device, all data packets of a same flow into one group, and separately allocating data packet sequence numbers to each group of data packets; and before the first device sends the flow identifier to the second device by using the data packet, the method further includes:

performing, by the first device, header compression and encryption on the data packet based on a bit in the data packet sequence number field of the data packet other than the bit occupied by the flow identifier.

According to the foregoing method, the first device separately allocates the data packet sequence numbers to each group of data packets, so that the first device performs header compression and encryption on the data packet based on the bit in the data packet sequence number field of the data packet other than the bit occupied by the flow identifier. In this way, the flow identifier can be carried in the data packet without changing a header compression algorithm and an encryption algorithm. This embodiment can be compatible with the prior art.

According to a second aspect, an embodiment of this application provides a data processing apparatus, including:

a processing unit, configured to: determine a flow to which a data packet belongs, and determine a flow identifier based on the flow to which the data packet belongs; and a transceiver unit, configured to send the data packet including the flow identifier to a second access network device.

According to a third aspect, an embodiment of this application provides a data processing apparatus, including:

a processor, configured to: determine a flow to which a data packet belongs, and determine a flow identifier based on the flow to which the data packet belongs; and a transceiver, configured to send the data packet including the flow identifier to a second access network device.

According to a fourth aspect, an embodiment of this application provides a data processing method, including:

determining, by a first device, an end data packet after a radio bearer RB to which a first flow is mapped changes from a first RB to a second RB, where the end data packet is a last data packet that is of the first flow and that is sent by the first device through the first RB; and sending, by the first device, end indication information and the end data packet to a second device, where the end indication information is used to indicate that the first device has completed sending of data packets of the first flow through the first RB.

According to the method provided in this embodiment of this application, when the RB to which the first flow is mapped changes, the first device sends the end indication information to indicate, to the second device, the last data packet that is of the first flow and that is sent by the first device through the first RB, so as to ensure that the second device processes all data packets in a data packet order, thereby avoiding data packet disorder.

Optionally, after the determining, by a first device, an end data packet, the method further includes:

sending, by the first device, all unsent data packets of the first flow through the second RB.

According to the foregoing method, when the RB mapped to the first flow changes, the first device can accurately determine a data packet transmitted through the changed RB, thereby avoiding data packet disorder.

Optionally, the determining, by a first device, that a radio bearer RB to which a first flow is mapped changes from a first RB to a second RB includes:

receiving, by the first device, a remapping indication sent by a third device, and determining, according to the remapping indication, that the RB to which the first flow is mapped changes from the first radio bearer RB to the second RB.

Optionally, the determining, by a first device, an end data packet includes:

determining, by the first device, that a last data packet that is in all to-be-acknowledged data packets of the first flow and that is sent through the first RB is the end data packet, where the to-be-acknowledged data packet is a data packet that is in a state in which the data packet has been sent but whether the data packet is correctly received by a receiver is not determined.

According to the foregoing method, the last data packet in all the to-be-acknowledged data packets of the first flow is determined as the end data packet, so that the end data packet can be accurately determined.

Optionally, the sending, by the first device, end indication information and the end data packet to a second device includes:

sending, by the first device, the end data packet including the end indication information to the second device; or sending, by the first device, the end indication information to the second device after sending the end data packet to the second device.

According to the foregoing method, the first device may send the end indication information by using the end data packet, or may separately send the end indication information, thereby improving flexibility of sending the end indication information, and improving efficiency.

Optionally, before the sending, by the first device, the end indication information to the second device after sending the end data packet to the second device, the method further includes:

receiving, by the first device, an acknowledgement message returned by the second device, and determining, based on the acknowledgement message, that both the end data packet and a data packet that is of the first flow and that is located before the end data packet are correctly received by the second device.

According to a fifth aspect, an embodiment of this application provides a data processing apparatus, including:

a processing unit, configured to determine an end data packet after a radio bearer RB to which a first flow is mapped changes from a first RB to a second RB, where the end data packet is a last data packet that is of the first flow and that is sent by a first device through the first RB; and a transceiver unit, configured to send end indication information and the end data packet to a second device, where the end indication information is used to indicate that the first device has completed sending of data packets of the first flow through the first RB.

According to a sixth aspect, an embodiment of this application provides a data processing apparatus, including:

a processor, configured to determine an end data packet after a radio bearer RB to which a first flow is mapped changes from a first RB to a second RB, where the end data packet is a last data packet that is of the first flow and that is sent by a first device through the first RB; and a transceiver, configured to send end indication information and the end data packet to a second device, where the end indication information is used to indicate that the first device has completed sending of data packets of the first flow through the first RB.

According to a seventh aspect, an embodiment of this application provides a data processing method, including:

receiving, by a second device, end indication information sent by a first device, where the end indication information is sent after the first device has completed sending of a last data packet of a first flow through a first radio bearer RB, and the end indication information is used to indicate that the first device has completed sending of data packets of the first flow through the first RB; and processing, by the second device, a data packet that is of the first flow and that is received through a second RB.

According to the method provided in this embodiment of this application, after receiving the end indication information, the second device may determine, according to the end indication information, the last data packet that is of the first flow and that is sent by the first device to the second device through the first RB, to ensure that the second device processes all data packets in a data packet order, thereby avoiding packet disorder.

According to an eighth aspect, an embodiment of this application provides a data processing apparatus, including:

a transceiver unit, configured to receive end indication information sent by a first device, where the end indication information is sent after the first device has completed sending of a last data packet of a first flow through a first radio bearer RB, and the end indication information is used to indicate that the first device has completed sending of data packets of the first flow through the first RB; and a processing unit, configured to process a data packet that is of the first flow and that is received through the second RB.

According to a ninth aspect, an embodiment of this application provides a data processing apparatus, including:

a transceiver, configured to receive end indication information sent by a first device, where the end indication information is sent after the first device has completed sending of a last data packet of a first flow through a first radio bearer RB, and the end indication information is used to indicate that the first device has completed sending of data packets of the first flow through the first RB; and a processor, configured to process a data packet that is of the first flow and that is received through the second RB.

According to a tenth aspect, an embodiment of this application provides a data processing method, and the method includes:

sending, by a first access network device, a first message to a second access network device, where the first message is used to request to hand over a terminal to the second access network device;

receiving, by the first access network device, a first response message that includes a first mapping relationship and that is returned by the second access network device, where the first mapping relationship is a mapping relationship that is between each flow in the terminal and a tunnel endpoint identifier TEID and that is determined by the second access network device; and forwarding, by the first access network device, a data packet of each flow in the terminal to the second access network device based on the first mapping relationship.

According to the method provided in this embodiment of this application, the first device forwards the data packet of each flow in the terminal to the second access network device based on the first mapping relationship sent by the second device, so that a mapping relationship between a flow and an RB changes when the terminal is handed over.

Optionally, the first message includes a second mapping relationship, and the second mapping relationship is a mapping relationship that is between each flow and an RB and that is used by the terminal in a network in which the first access network device is located.

According to the foregoing method, the second mapping relationship is sent to the second device, so that the second device can determine the mapping relationship that is between each flow and an RB and that is used in the network in which the first access network device is located, and the second device can send data to the first device based on the second mapping relationship.

Optionally, the first response message further includes a third mapping relationship, and the third mapping relationship is a mapping relationship that is between a flow and an RB and that is determined by the second access network device for each flow in the terminal or a mapping relationship that is between a flow and an RB and that is determined by a core network device corresponding to the second access network device for each flow in the terminal.

Optionally, the method further includes:

sending, by the first access network device, a handover command to the terminal to instruct the terminal to access the second access network device, where the handover command includes the third mapping relationship.

Optionally, flows mapped to a same RB in the third mapping relationship are mapped to a same TEID in the first mapping relationship, and flows mapped to different RBs in the third mapping relationship are mapped to different TEIDs in the first mapping relationship.

According to the foregoing method, the first device sends a data packet of each RB in the terminal to the second access network device through a tunnel, thereby sending the data packet to the second device in units of RBs.

Optionally, the second mapping relationship is different from the third mapping relationship.

Before the forwarding, by the first access network device, a data packet of each flow in the terminal to the second access network device based on the first mapping relationship, the method further includes:

deleting, by the first access network device, a data packet sequence number of the data packet of each flow in the terminal.

Optionally, all flows in the first mapping relationship are mapped to different TEIDs.

According to the foregoing method, the first device sends the data packet of each flow in the terminal to the second access network device through a tunnel, thereby sending the data packet to the second device in units of flows.

According to an eleventh aspect, an embodiment of this application provides a data processing apparatus, including:

a transceiver unit, configured to: send a first message to a second access network device, where the first message is used to request to hand over a terminal to the second access network device; and receive a first response message that includes a first mapping relationship and that is returned by the second access network device, where the first mapping relationship is a mapping relationship between each flow in the terminal and a tunnel endpoint identifier TEID; and a processing unit, configured to forward a data packet of each flow in the terminal to the second access network device based on the first mapping relationship.

According to a twelfth aspect, an embodiment of this application provides a data processing apparatus, including:

a transceiver, configured to: send a first message to a second access network device, where the first message is used to request to hand over a terminal to the second access network device; and receive a first response message that includes a first mapping relationship and that is returned by the second access network device, where the first mapping relationship is a mapping relationship between each flow in the terminal and a tunnel endpoint identifier TEID; and a processor, configured to forward a data packet of each flow in the terminal to the second access network device based on the first mapping relationship.

According to a thirteenth aspect, an embodiment of this application provides a data processing method, and the method includes:

receiving, by a second access network device, a first message sent by a first access network device, where the first message is used to request to hand over a terminal to the second access network device; and returning, by the second access network device, a first response message including a first mapping relationship to the first access network device, and receiving a data packet that is of each flow in the terminal and that is forwarded by the first access network device based on the first mapping relationship, where the first mapping relationship is a mapping relationship that is between each flow in the terminal and a TEID and that is determined by the second access network device.

Optionally, the first message includes a second mapping relationship, and the second mapping relationship is a mapping relationship that is between each flow and an RB and that is used by the terminal in a network in which the first access network device is located.

Optionally, the first response message further includes a third mapping relationship, and the third mapping relationship is a mapping relationship that is between a flow and an RB and that is determined by the second access network device for each flow in the terminal or a mapping relationship that is between a flow and an RB and that is determined by a core network device corresponding to the second access network device for each flow in the terminal.

Optionally, after the receiving, by the second access network device, a data packet that is of each flow in the terminal and that is forwarded by the first access network device based on the first mapping relationship, the method further includes:

determining, by the second access network device based on the second mapping relationship and the third mapping relationship, that a first RB to which a target flow is mapped in the second mapping relationship changes to a second RB, and after receiving a target data packet of the target flow, determining an RB used for sending the target data packet; where the target flow is any flow in the second mapping relationship, and the target data packet is any data packet of the target flow.

Optionally, the determining, by the second access network device, an RB used for sending the target data packet includes:

sending, by the second access network device, the target data packet on the first RB if determining that the target data packet is not correctly received by a receiver of the target data packet and a data packet following the target data packet is correctly received by the receiver of the target data packet; or sending, by the second access network device, the target data packet on the second RB if determining that the target data packet is not correctly received by a receiver of the target data packet and a data packet following the target data packet is not correctly received by the receiver of the target data packet; or sending, by the second access network device, the target data packet on the second RB if determining that the target data packet is not correctly received by a receiver of the target data packet; or sending, by the second access network device, the target data packet on the first RB if the second access network device cannot determine a receiving status of the target data packet.

Optionally, flows mapped to a same RB in the third mapping relationship are mapped to a same TEID in the first mapping relationship, and flows mapped to different RBs in the third mapping relationship are mapped to different TEIDs in the first mapping relationship.

According to a fourteenth aspect, an embodiment of this application provides a data processing apparatus, including:

a transceiver unit, configured to: receive a first message sent by a first access network device, where the first message is used to request to hand over a terminal to a second access network device; and return a first response message including a first mapping relationship to the first access network device, and receive a data packet that is of each flow in the terminal and that is forwarded by the first access network device based on the first mapping relationship, where the first mapping relationship is a mapping relationship that is between each flow in the terminal and a TEID and that is determined by the second access network device.

According to a fifteenth aspect, an embodiment of this application provides a data processing apparatus, including:

a transceiver, configured to: receive a first message sent by a first access network device, where the first message is used to request to hand over a terminal to a second access network device; and return a first response message including a first mapping relationship to the first access network device, and receive a data packet that is of each flow in the terminal and that is forwarded by the first access network device based on the first mapping relationship, where the first mapping relationship is a mapping relationship that is between each flow in the terminal and a TEID and that is determined by the second access network device.

According to a sixteenth aspect, an embodiment of this application provides a data processing method, and the method includes:

sending, by a first access network device, a first message to a first core network device, where the first message is used to request to hand over a terminal from the first access network device to a second access network device;

receiving, by the first access network device, a first response message that includes a first mapping relationship and that is returned by the first core network device, where the first mapping relationship is a mapping relationship that is between each RB and a TEID and that is determined by the second access network device for the terminal; and forwarding, by the first access network device, a data packet of each RB in the terminal to the second access network device based on the first mapping relationship.

Optionally, all RBs in the first mapping relationship are mapped to a same TEID; or all RBs in the first mapping relationship are mapped to different TEIDs.

According to a seventeenth aspect, an embodiment of this application provides a data processing apparatus, including:

a transceiver unit, configured to send a first message to a first core network device, where the first message is used to request to hand over a terminal from a first access network device to a second access network device; and receive a first response message that includes a first mapping relationship and that is returned by the first core network device, where the first mapping relationship is a mapping relationship that is between each RB and a TEID and that is determined by the second access network device for the terminal; and a processing unit, configured to forward a data packet of each RB in the terminal to the second access network device based on the first mapping relationship.

According to an eighteenth aspect, an embodiment of this application provides a data processing apparatus, including:

a transceiver, configured to send a first message to a first core network device, where the first message is used to request to hand over a terminal from a first access network device to a second access network device; and receive a first response message that includes a first mapping relationship and that is returned by the first core network device, where the first mapping relationship is a mapping relationship that is between each RB and a TEID and that is determined by the second access network device for the terminal; and a processor, configured to forward a data packet of each RB in the terminal to the second access network device based on the first mapping relationship.

According to a nineteenth aspect, an embodiment of this application provides a data processing method, and the method includes:

determining, by a second core network device, a second mapping relationship, where the second mapping relationship is a mapping relationship that is between each RB and a flow and that is used by a terminal in a network in which a first access network device is located, and the second mapping relationship is determined based on a TFT template used by each RB in the terminal in a network in which a first core network device is located and a TFT template used by each RB in the terminal in a network in which the second core network device is located; and sending, by the second core network device, a third message including the second mapping relationship to a second access network device, where the third message is used to request to hand over the terminal from the first access network device to the second access network device.

Optionally, after the sending, by the second core network device, a third message including the second mapping relationship to a second access network device, the method further includes:

receiving, by the second core network device, a response message that includes a first mapping relationship and that is returned by the second access network device, where the first mapping relationship is a mapping relationship that is between each RB and a TEID and that is determined by the second access network device for the terminal.

According to a twentieth aspect, an embodiment of this application provides a data processing apparatus, including:

a processing unit, configured to determine a second mapping relationship, where the second mapping relationship is a mapping relationship that is between each RB and a flow and that is used by a terminal in a network in which a first access network device is located, and the second mapping relationship is determined based on a TFT template used by each RB in the terminal in a network in which a first core network device is located and a TFT template used by each RB in the terminal in a network in which a second core network device is located; and a transceiver unit, configured to send a third message including the second mapping relationship to a second access network device, where the third message is used to request to hand over the terminal from the first access network device to the second access network device.

According to a twenty-first aspect, an embodiment of this application provides a data processing apparatus, including:

a processor, configured to determine a second mapping relationship, where the second mapping relationship is a mapping relationship that is between each RB and a flow and that is used by a terminal in a network in which a first access network device is located, and the second mapping relationship is determined based on a TFT template used by each RB in the terminal in a network in which a first core network device is located and a TFT template used by each RB in the terminal in a network in which a second core network device is located; and a transceiver, configured to send a third message including the second mapping relationship to a second access network device, where the third message is used to request to hand over the terminal from the first access network device to the second access network device.

According to a twenty-second aspect, an embodiment of this application provides a data processing method, and the method includes:

receiving, by a second access network device, a third message that includes a second mapping relationship and that is sent by a second core network device, where the third message is used to request to hand over a terminal from a first access network device to the second access network device, and the second mapping relationship is a mapping relationship that is between each RB and a flow and that is used by the terminal in a network in which the first access network device is located; and returning, by the second access network device, a response message including a first mapping relationship to the second core network device, where the first mapping relationship is a mapping relationship that is between each RB and a TEID and that is determined by the second access network device for the terminal.

According to the method provided in this embodiment of this application, the second access network device returns the response message including the first mapping relationship to the second core network device, so that the second core network device can determine a mapping relationship between each RB in the terminal and a TEID.

Optionally, the response message further includes mapping relationship mapping indication information, and the mapping relationship mapping indication information is used to indicate that a mapping relationship that is between each RB and a flow, determined by the second access network device, and used by the terminal in a network in which the second access network device is located is the same as the second mapping relationship.

Optionally, the response message further includes a sequence indication message, and the sequence indication message is used to indicate that a data packet of the terminal that is forwarded by the first access network device to the second access network device carries a data packet sequence number allocated by the first access network device.

Optionally, the third message further includes a TFT template used by each RB in the terminal in a network in which the second core network device is located.

Optionally, all RBs in the first mapping relationship are mapped to a same TEID.

After the returning, by the second access network device, a response message including a first mapping relationship to the second core network device, the method further includes:

receiving, by the second access network device, a data packet that is of each RB in the terminal and that is forwarded by the first access network device; and filtering, by the second access network device, the data packet of each RB in the terminal into a data packet of each flow based on the TFT template used by each RB in the terminal in the network in which the second core network device is located.

Optionally, before the filtering, by the second access network device, the data packet of each RB in the terminal into a data packet of each flow based on the TFT template used by each RB in the terminal in the network in which the second core network device is located, the method further includes:

deleting, by the second access network device, a data packet sequence number allocated by the first access network device to the data packet of each RB in the terminal; and after the filtering, by the second access network device, the data packet of each RB in the terminal into a data packet of each flow based on the TFT template used by each RB in the terminal in the network in which the second core network device is located, the method further includes:

determining, by the second access network device, an RB to which the data packet of each flow belongs; and for the data packet of each RB, performing, by the second access network device, data convergence processing on the data packet of each RB by using a data packet sequence allocated by the first access network to each data packet.

According to a twenty-third aspect, an embodiment of this application provides a data processing apparatus, including:

a transceiver unit, configured to: receive a third message that includes a second mapping relationship and that is sent by a second core network device, where the third message is used to request to hand over a terminal from a first access network device to a second access network device, and the second mapping relationship is a mapping relationship that is between each RB and a flow and that is used by the terminal in a network in which the first access network device is located; and return a response message including a first mapping relationship to the second core network device, where the first mapping relationship is a mapping relationship that is between each RB and a TEID and that is determined by the second access network device for the terminal.

According to a twenty-fourth aspect, an embodiment of this application provides a data processing apparatus, including:

a transceiver, configured to: receive a third message that includes a second mapping relationship and that is sent by a second core network device, where the third message is used to request to hand over a terminal from a first access network device to a second access network device, and the second mapping relationship is a mapping relationship that is between each RB and a flow and that is used by the terminal in a network in which the first access network device is located; and return a response message including a first mapping relationship to the second core network device, where the first mapping relationship is a mapping relationship that is between each RB and a TEID and that is determined by the second access network device for the terminal.

According to a twenty-fifth aspect, an embodiment of this application provides a data processing method, and the method includes:

allocating, by an access network device, an uplink resource to a terminal; and sending, by the access network device, first indication information to the terminal, where the first indication information is used to indicate a transmission success rate of correctly transmitting data on the uplink resource.

According to the method provided in this embodiment of this application, when allocating the uplink resource to the terminal, the access network device indicates, to the terminal, the transmission success rate of correctly transmitting the data on the uplink resource, so that the terminal can determine, based on the transmission success rate of correctly transmitting the data on the uplink resource, the data transmitted on the uplink resource, thereby improving a transmission success rate of data whose priority is higher.

Optionally, the first indication information is a specific value of the transmission success rate; or the first indication information is an index value, and the index value is corresponding to a specific value of the transmission success rate.

According to a twenty-sixth aspect, an embodiment of this application provides a data processing apparatus, including:

a processing unit, configured to allocate an uplink resource to a terminal; and a transceiver unit, configured to send first indication information to the terminal, where the first indication information is used to indicate a transmission success rate of correctly transmitting data on the uplink resource.

According to a twenty-seventh aspect, an embodiment of this application provides a data processing apparatus, including:

a processor, configured to allocate an uplink resource to a terminal; and a transceiver, configured to send first indication information to the terminal, where the first indication information is used to indicate a transmission success rate of correctly transmitting data on the uplink resource.

According to a twenty-eighth aspect, an embodiment of this application provides a data processing method, and the method includes:

determining, by a terminal, an uplink resource allocated by an access network device to the terminal, and receiving first indication information sent by the access network device, where the first indication information is used to indicate a transmission success rate of correctly transmitting data on the uplink resource; and transmitting, by the terminal, the data on the uplink resource according to the first indication information.

According to the method provided in this embodiment of this application, after receiving the first indication information sent by the access network device, the terminal can determine, based on the transmission success rate of correctly transmitting the data on the uplink resource, the data transmitted on the uplink resource, thereby improving a transmission success rate of data whose priority is higher.

Optionally, the transmitting, by the terminal, the data on the uplink resource according to the first indication information includes:

if determining that the transmission success rate indicated by the first indication information is greater than a first threshold, transmitting, by the terminal on the uplink resource, data corresponding to a service whose transmission priority is greater than a first preset priority; or if determining that the transmission success rate indicated by the first indication information is less than a second threshold, transmitting, by the terminal on the uplink resource, data corresponding to a service whose transmission priority is less than a second preset priority.

Optionally, the first indication information is a specific value of the transmission success rate; or the first indication information is an index value, and the index value is corresponding to a specific value of the transmission success rate.

According to a twenty-ninth aspect, an embodiment of this application provides a data processing apparatus, including:

a processing unit, configured to: determine an uplink resource allocated by an access network device to a terminal, and receive first indication information sent by the access network device, where the first indication information is used to indicate a transmission success rate of correctly transmitting data on the uplink resource; and a transceiver unit, configured to transmit the data on the uplink resource according to the first indication information.

According to a thirtieth aspect, an embodiment of this application provides a data processing apparatus, including:

a processor, configured to: determine an uplink resource allocated by an access network device to a terminal, and receive first indication information sent by the access network device, where the first indication information is used to indicate a transmission success rate of correctly transmitting data on the uplink resource; and a transceiver, configured to transmit the data on the uplink resource according to the first indication information.

DESCRIPTION OF EMBODIMENTS

In the prior art, each RB in a radio access network device is corresponding to one PDCP (packet data convergence protocol) entity and one RLC (radio link control) entity. When sending a data packet, the radio access network device adds each data packet to a PDCP entity corresponding to an RB to which each data packet belongs, to perform processing such as PDCP SN (sequence number) allocation, header compression, encryption, and PDCP header addition, and then sends, in an order of PDCP SNs, data packets through an RLC entity to which each data packet belongs. Correspondingly, after receiving the data packets, the radio access network device sequentially transmits the data packets from the RLC entity to the PDCP entity based on the PDCP SNs of the data packets, to perform processing such as PDCP header removal, decryption, and header decompression.

Currently, the radio access network device can implement only RB-level data packet processing, and there is no effective solution for implementing flow-level data packet processing.

In the embodiments of this application, a terminal may be a wireless terminal, such as a mobile phone, a computer, a tablet computer, a personal digital assistant (PDA), a mobile Internet device (MID), a wearable device, an Internet Protocol (IP) telephone, a network printer, an e-book, or any other type of user equipment (UE) that can work in a wireless environment.

Figure 1:
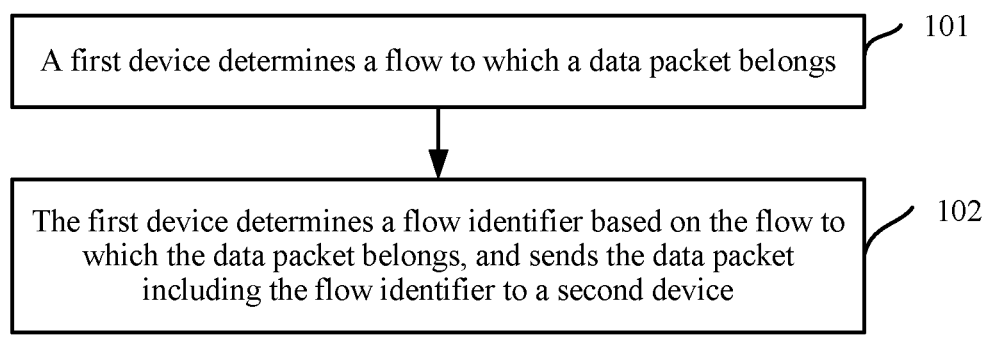
FIG. 1 is a schematic flowchart of a data processing method according to an embodiment of this application.

Based on the foregoing description, as shown in FIG. 1, FIG. 1 is a schematic flowchart of a data processing method according to an embodiment of this application.

Referring to FIG. 1, the method includes the following steps:

Step 101: A first device determines a flow to which a data packet belongs.

Step 102: The first device determines a flow identifier based on the flow to which the data packet belongs, and sends the data packet including the flow identifier to a second device.

In step 101, the first device may be an access network device, or may be a device such as a terminal. This is not limited in this embodiment of this application.

The first device may determine, based on an actual situation, the flow to which the data packet belongs. For example, the first device may determine, based on a service type, a destination address, a port, and the like that are corresponding to the data packet, the flow to which the data packet belongs. This is not limited in this embodiment of this application.

In step 102, the second device may be an access network device, or may be a device such as a terminal. This is not limited in this embodiment of this application.

The following two manners may be available for the first device to determine the flow identifier based on the flow to which the data packet belongs.

In a possible implementation, the first device may allocate the flow identifier to the data packet based on the flow to which the data packet belongs. It should be noted that in this scenario, the first device may pre-allocate a flow identifier to each flow, and then allocate, to the data packet based on the flow to which the data packet belongs, the flow identifier that is in the flow identifier pre-allocated to each flow and that is corresponding to the flow to which the data packet belongs. After allocating the flow identifier to each flow, the first device may further send the flow identifier of each flow to the second device through RRC (radio resource control) signaling. Certainly, the first device may further send the flow identifier of each flow to a device such as a terminal or a core network device.

In another possible implementation, the first device determines, from a flow identifier list sent by a third device, the flow identifier corresponding to the flow to which the data packet belongs. The third device and the second device may be a same device or may be different devices. The third device may be a device such as a core network device or a terminal that is connected to the first device, and this is not limited in this embodiment of this application.

The third device may send the flow identifier list to the first device through RRC signaling or PDCP layer signaling.

Before the first device sends the data packet to the second device after determining the flow identifier of the flow to which the data packet belongs, the first device may converge the determined data packet into a convergence protocol entity corresponding to an RB of each data packet, and then perform processing such as data packet sequence number allocation, header compression, encryption, and protocol header addition on the data packet in each convergence protocol entity. The convergence protocol entity may be a PDCP entity, or may be an entity having a similar function as the PDCP entity. A data packet sequence number may be a PDCP SN, or may be a sequence having a similar function as the PDCP SN. A protocol header may be a PDCP header, or may be a packet header having a similar function as the PDCP header. This is not limited in this embodiment of this application.

In this embodiment of this application, when allocating a data packet sequence number to a data packet, the first device may allocate, in a centralized manner, data packet sequence numbers to all data packets of a plurality of flows mapped to a single RB, that is, when allocating a data packet sequence number, the first device does not determine a flow to which a data packet belongs. In this way, this embodiment can be compatible with the existing protocol, thereby avoiding making a big change to the existing protocol.

Optionally, when allocating a data packet sequence number to a data packet, the first device may arrange all data packets of a same flow into one group, and separately allocate data packet sequence numbers to each group of data packets, that is, when allocating a data packet sequence number, the first device needs to determine a flow to which a data packet belongs.

For example, a flow 1 to a flow 3 are mapped to a single RB. The first device chronologically receives five data packets: a packet 1 to a packet 5. The data packet 1 and the data packet 4 belong to the flow 1, the data packet 3 and the data packet 5 belong to the flow 2, and the data packet 2 belongs to the flow 3. In this case, data packet sequence numbers separately allocated by the first device to the data packet 1 to the data packet 5 may be 1, 1, 1, 2, and 2.

In the implementation of separately allocating the data packet sequence numbers to each group of data packets, the first device needs to perform header compression and encryption on the data packet based on a bit in a data packet sequence number field of the data packet other than a bit occupied by the flow identifier.

For example, before performing header compression and encryption on the data packet, the first device may first set a value of the bit occupied by the flow identifier to 1 or 0, and then perform header compression and encryption on the data packet. In addition, when performing header compression and encryption on the data packet, the first device may separately perform operations such as header compression and encryption on data packets of each flow, and finally process the data packets together only during PDCP header addition. In this way, data packet sequence numbers used during header compression and encryption are consecutive, and this embodiment can be compatible with the prior art.

In this embodiment of this application, after determining the flow identifier of the data packet, the first device may add the flow identifier to the data packet and send the data packet to the second device. In a possible implementation, the first device adds the flow identifier to a packet header of the data packet, so that the flow identifier is sent to the second device through the data packet. In this embodiment of this application, a new field may be added to the packet header of the data packet as a flow identifier field, or an existing field in the packet header of the data packet may be redefined as a flow identifier field. For example, a reserved field in the data packet may be redefined as the flow identifier field. For example, a reserved field in a PDCP header of the data packet is redefined as the flow identifier field.

In another possible implementation, the first device uses K bits in the data packet sequence number field to carry the flow identifier, where K is a positive integer. A value of K may be determined based on an actual situation, and this is not limited herein.

In this case, the flow identifier is located in the data packet sequence number field of the data packet, and occupies the K bits in the data packet sequence number field.

For example, the data packet sequence number is a PDCP SN. In this case, the first device may use the first K bits in a PDCP SN field to carry the flow identifier.

In the foregoing implementation, an explicit bit is added to a data packet to identify each flow, to indicate a flow to which each data packet belongs. In addition, an implicit manner may also be used to indicate the flow to which each data packet belongs. For example, an advance agreement between the first device and each of the second device, the terminal, and the core network device may be reached: the flow to which each data packet belongs may be indicated based on a data packet sequence number of the data packet. For example, when the data packet sequence number of the data packet is an odd number, it indicates that the data packet is from the flow 0; when the data packet sequence number of the data packet is an even number, it indicates that the data packet is from the flow 1. Optionally, the advance agreement between the first device and each of the second device, the terminal, and the core network device may be reached through RRC signaling or PDCP layer control signaling.

According to the method provided in this embodiment of this application, after determining the flow identifier of the data packet, the first device sends the flow identifier to the second device by using the data packet, to indicate the flow to which the data packet belongs to the second device. In this method, the second device can perform flow-level data packet processing, thereby further improving peer-to-peer QoS performance.

The following describes the process in FIG. 1 in detail by using a specific embodiment.

Figure 2:
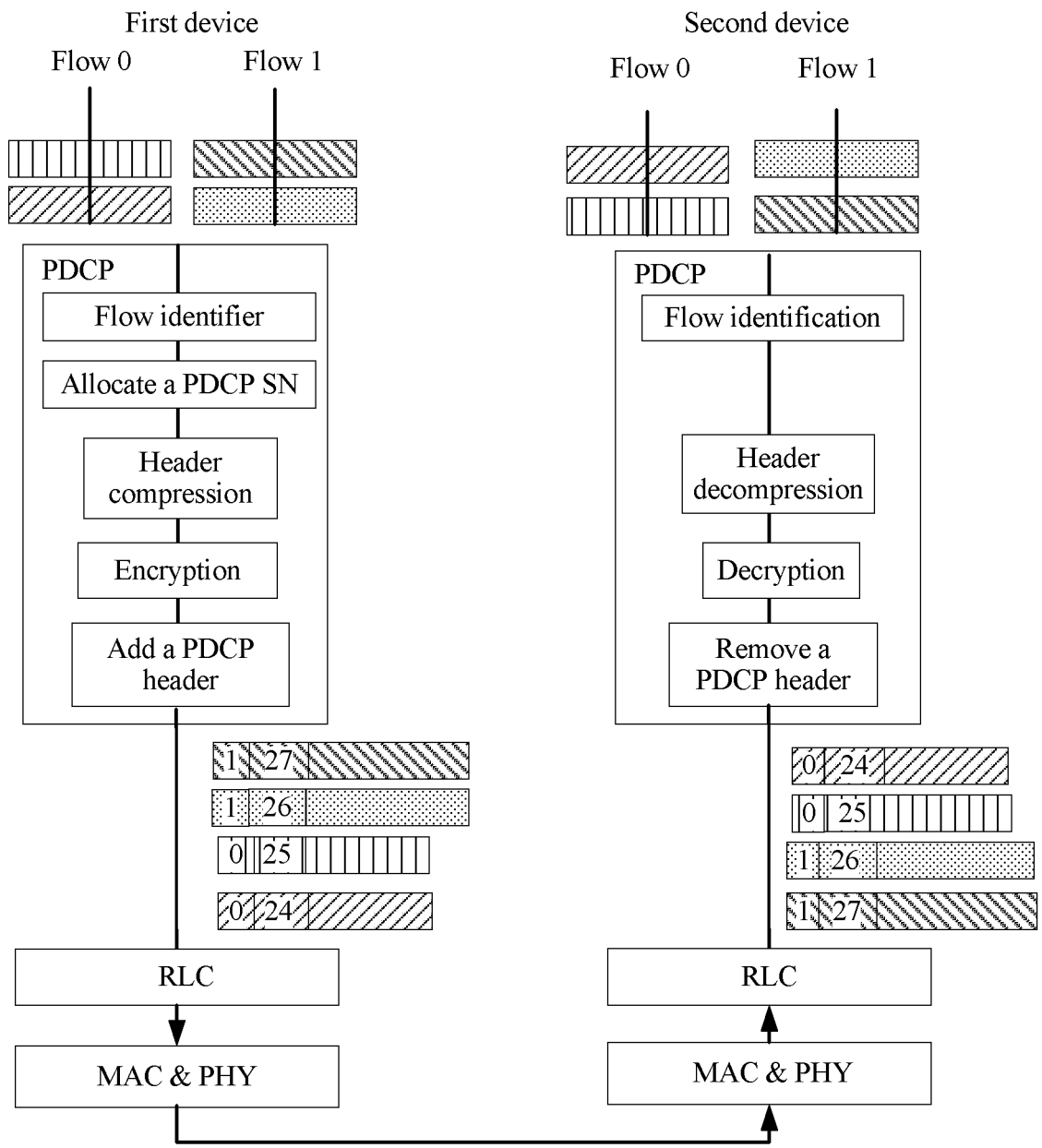
FIG. 2 is a schematic flowchart of a data processing method according to an embodiment of this application.

As shown in FIG. 2, FIG. 2 is a schematic flowchart of a data processing method according to an embodiment of this application.

In FIG. 2, a PDCP layer, an RLC layer, and a MAC layer are used as an embodiment for description, but the solution in this embodiment of this application is not limited to these layers. In FIG. 2, after receiving data packets of a flow 0 (flow 0) and a flow 1 (flow 1), a first device determines to map the two flows to a single RB for transmission, and determines a flow identifier for each data packet. In FIG. 2, a flow identifier allocated by the first device to the flow 0 (flow 0) is 0, and a flow identifier allocated by the first device to the flow 1 (flow 1) is 1. The flow identifier allocated by the first device to each flow may be located in a PDCP header of a data packet, or may occupy K bits in a PDCP SN field. A quantity of bits occupied by the flow identifier may be determined based on a quantity of flows.

A PDCP entity of the first device further needs to allocate PDCP SNs to the data packets of the two flows in a centralized manner. Specifically, PDCP SNs 24 and 25 are allocated to two data packets of the flow 0, and PDCP SNs 26 and 27 are allocated to two data packets of the flow 1. This method also applies if there are more than two flows converged in a single RB. Then, the first device separately performs processing such as header compression, encryption, and PDCP header addition on all data packets, and sends the data packets to an RLC entity. A MAC entity forwards the data packets to a PHY entity, and the PHY entity sends the data packets to a second device. After the second device receives the data packets sent by the first device, a PDCP entity of the second device separately performs operations such as PDCP header removal, decryption, and header decompression on the received data packets, and finally identifies, based on a flow identifier allocated by the first device, a flow to which each data packet belongs, to classify the received data packets into flows and transmit the data packets to an upper layer. In this implementation, the PDCP entity can implement encryption and header compression/header decompression on different flows by using respective sub-entities. In this implementation, SNs used by the sub-entities are inconsecutive. In another implementation, the PDCP entity performs encryption and header compression/header decompression on different flows by using a same set of sub-entities. In this implementation, PDCP SNs used by the sub-entities are consecutive.

Figure 3:
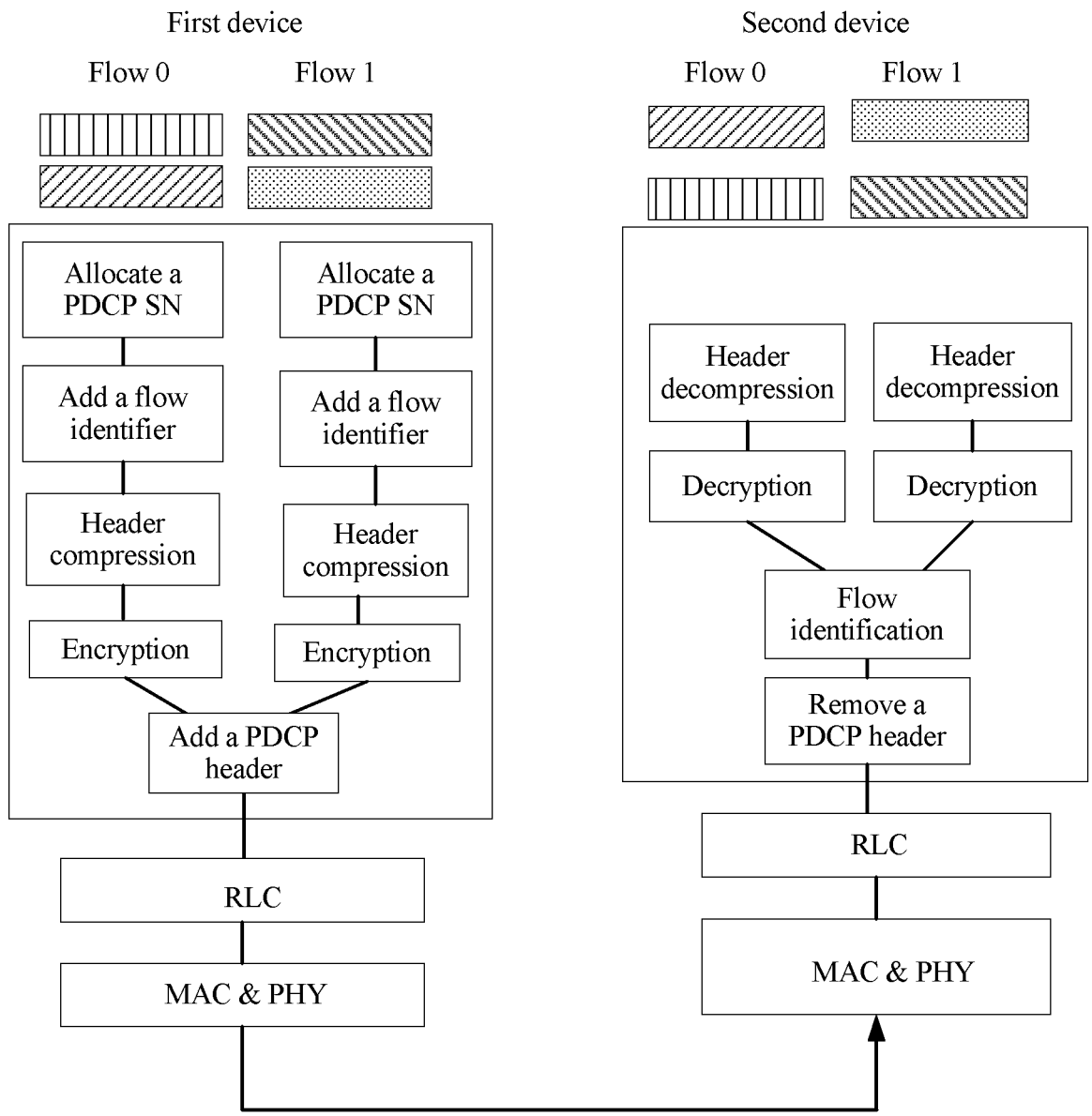
FIG. 3 is a schematic flowchart of a data processing method according to an embodiment of this application.

With reference to FIG. 2, as shown in FIG. 3, FIG. 3 is a schematic flowchart of a data processing method according to an embodiment of this application. In FIG. 3, a PDCP entity of a first device may separately perform processing such as PDCP SN allocation, flow identifier addition, header compression, and encryption on data packets of two flows, and finally process the data packets together only during PDCP header addition. A biggest benefit of this implementation is that PDCP SNs used during header compression and encryption are consecutive, and this is the same as the prior art. Therefore, changes to a header compression algorithm and an encryption algorithm are relatively small. Correspondingly, after a second device receives data packets sent by the first device, a PDCP entity of the second device performs PDCP header removal on the data packets together, then identifies, based on a flow identifier allocated by the first device, a flow to which each data packet belongs, and finally separately performs processing such as decryption and header decompression on data packets of each flow. In this implementation, the PDCP entity can implement encryption and header compression/header decompression on different flows through a same set of sub-enteritis.

An RB to which a flow is mapped may vary with an air interface radio condition, service QoS, or user subscription information. When the RB to which the flow is mapped changes from a source RB to a target RB, in a buffer corresponding to a source RB in a transmitter, some unsent data packets of the flow or some data packets that are in a state in which the data packets have been transmitted but whether the data packets are correctly received by a receiver is not determined by the transmitter may exist. There is no effective solution for processing the data packets.

Figure 4:
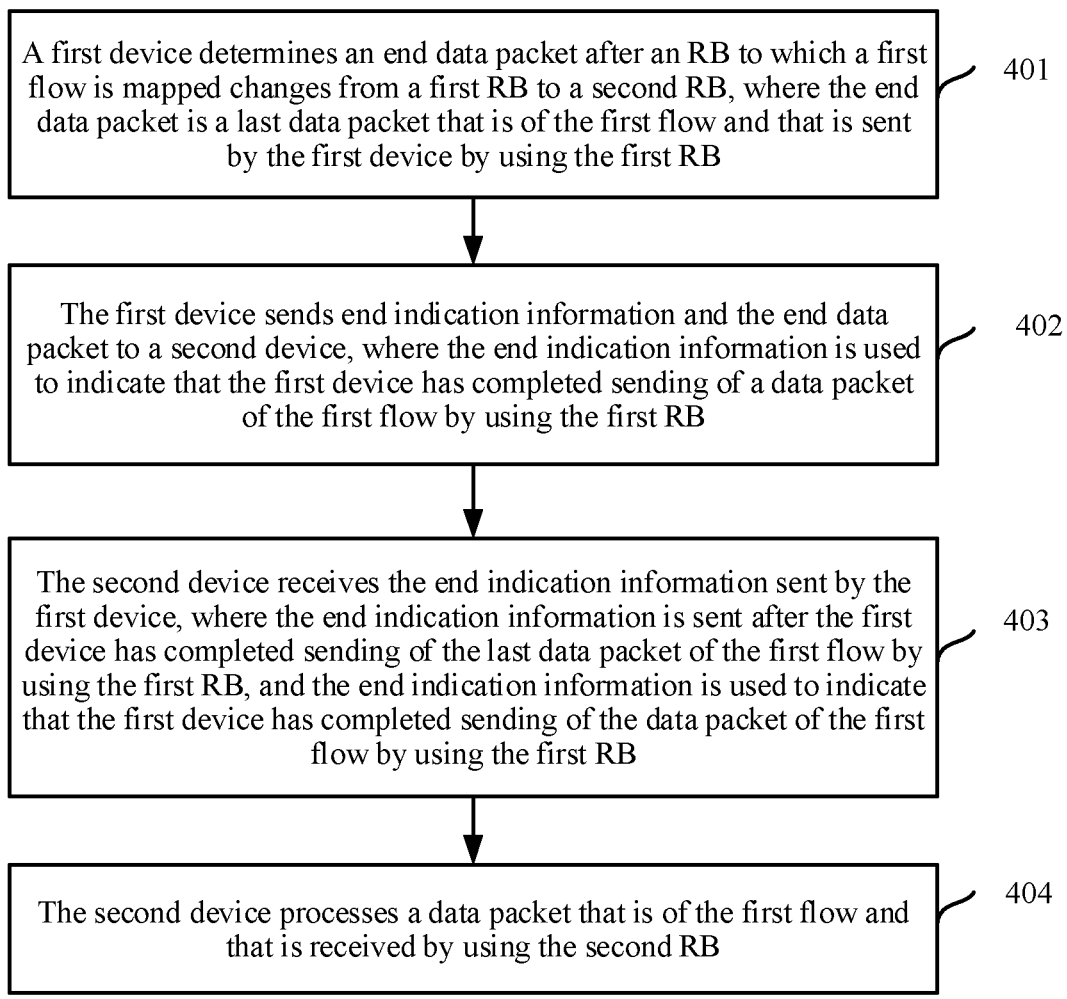
FIG. 4 is a schematic flowchart of a data processing method according to an embodiment of this application.

Based on the foregoing description, as shown in FIG. 4, FIG. 4 is a schematic flowchart of a data processing method according to an embodiment of this application. In the procedure shown in FIG. 4, a first device may be a terminal or an access network device, and a second device may be a terminal or an access network device.

Referring to FIG. 4, the method includes the following steps:

Step 401: A first device determines an end data packet after an RB to which a first flow is mapped changes from a first RB to a second RB, where the end data packet is a last data packet that is of the first flow and that is sent by the first device through the first RB.

Step 402: The first device sends end indication information and the end data packet to a second device, where the end indication information is used to indicate that the first device has completed sending of data packets of the first flow through the first RB.

Step 403: The second device receives the end indication information sent by the first device, where the end indication information is sent after the first device has completed sending of the last data packet of the first flow through the first RB, and the end indication information is used to indicate that the first device has completed sending of the data packets of the first flow through the first RB.

Step 404: The second device processes a data packet that is of the first flow and that is received through the second RB.

In step 401, the first device may receive a remapping indication sent by a third device, and determine, according to the remapping indication, that the RB to which the first flow is mapped changes from the first RB to the second RB. The remapping indication includes a mapping relationship between the first flow and the second RB, and certainly, the remapping indication may further include a mapping relationship between the first flow and the first RB. The third device may be a device such as a core network device or a terminal that is connected to the first device, and the third device may alternatively be a device that is the same as the second device. This is not limited in this embodiment of this application.

After the first device determines the RB to which the first flow is mapped changing from the first RB to the second RB, an unsent data packet of the first flow and a data packet that is in a state in which the data packet has been sent but whether the data packet is correctly received by a receiver is not determined may exist in a buffer corresponding to the first RB.

For the unsent data packet of the first flow, the first device may send all unsent data packets of the first flow through the second RB. Alternatively, the first device may still send all unsent data packets of the first flow through the first RB. In this case, the end indication information is sent through an RB existing before the RB to which the first flow is mapped changes, that is, the first device sends the end indication information through the first RB.

If the first device sends all the unsent data packets of the first flow through the second RB, before sending the data packets, the first device needs to perform operations such as data packet sequence number re-allocation, re-encryption, and header recompression on all the unsent data packets of the first flow. Correspondingly, if data packet sequence numbers of data packets sent through the first RB are inconsecutive, the data packet sequence numbers need to be re-allocated to obtain consecutive data packet sequence numbers. The "inconsecutive data packet sequence numbers" herein exist because although data packet sequences of the data packet on the first RB are originally consecutive, after the first device determines that the RB to which the first flow is mapped changes, the data packet sequences of the data packets on the first RB are permuted when an unsent data packet of the first flow on the first RB is sent through the second RB. There is a vacancy between the data packet sequences of the data packets on the first RB, and a vacant data packet sequence number is a data packet sequence number of the unsent data packet of the first flow on the first RB.

The first device may first determine the end data packet from the data packet that is in a state in which the data packet has been sent but whether the data packet is correctly received by the receiver is not determined, and then send the end indication information and the end data packet to the second device. Specifically, if the first device sends all the unsent data packets of the first flow through the second RB, the first device may determine that a last data packet in all to-be-acknowledged data packets of the first flow that are sent through the first RB is the end data packet, and the to-be-acknowledged data packet is a data packet that is in a state in which the data packet has been sent but whether the data packet is correctly received by the receiver is not determined. If the first device still sends all the unsent data packets of the first flow through the first RB, the first device may determine that a last data packet in all the unsent data packets and all the to-be-acknowledged data packets of the first flow that are sent through the first RB is the end data packet.

It should be noted that how to determine the end data packet is an internal implementation of the first device, that is, the first device may determine any data packet as the end data packet. The description herein is merely an embodiment.

In step 402, the first device may add the end indication information to the end data packet for sending, or may separately send the end indication information and the end data packet.

Specifically, in a possible implementation, the first device sends the end data packet including the end indication information to the second device. In this implementation, the end indication information may be located at any location of the end data packet. For example, the end indication information may be located in a data packet header of the end data packet.

In another possible implementation, the first device sends the end indication information to the second device after sending the end data packet to the second device. It should be noted that in this implementation, after sending the end data packet to the second device, and before sending the end indication information to the second device, the first device needs to first receive an acknowledgement message returned by the second device, and send the end indication information to the second device after determining, based on the acknowledgement message, that both the end data packet and a data packet that is of the first flow and that is before the end data packet are correctly received by the second device. In this implementation, the first device may generate a control packet including the end indication information, and send the control packet to the second device through the first RB or the second RB, to send the end indication information to the second device.

After the second device receives the end indication information in step 403, in step 404, the second device may determine that the first device has completed sending of the data packets of the first flow through the first RB. In this case, the second device may determine when to transmit the data packet that is of the first flow and that is received through the second RB to an upper protocol layer for processing, for example, a PDCP layer.

It should be noted that the data packet in the foregoing method procedure may be an uplink data packet or a downlink data packet. This is not limited in this embodiment of this application.

According to the method provided in this embodiment of this application, when the RB to which the first flow is mapped to changes, the end indication information is sent to indicate, to the second device, the last data packet that is of the first flow and that is sent by the first device through the first RB, so as to ensure that the second device processes all data packets in a data packet order, thereby avoiding data packet disorder.

The following describes the process in FIG. 4 in detail by using a specific embodiment.

Figure 5:
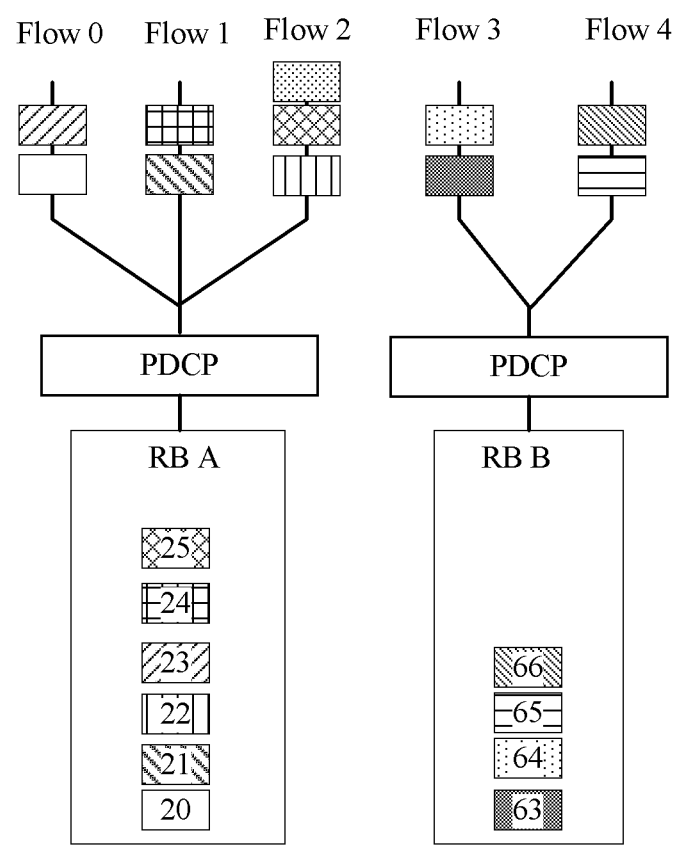
FIG. 5 (*a*) to FIG. 5 (*c*) are schematic flowcharts of a data processing method according to an embodiment of this application.
Figure 5:
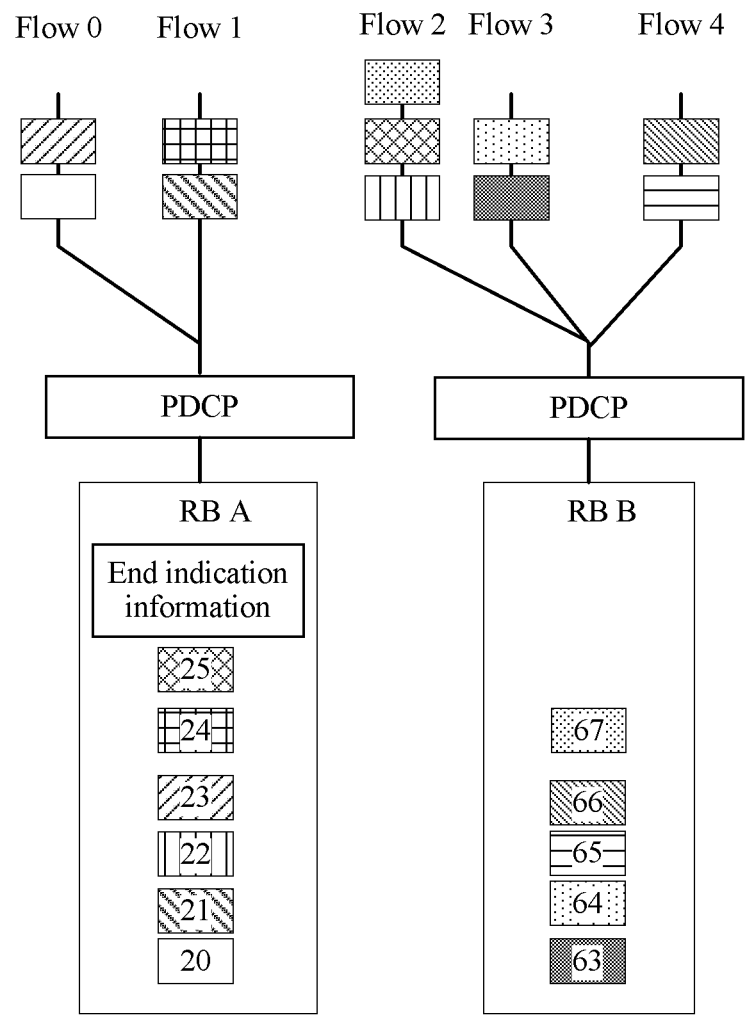
Figure 5:
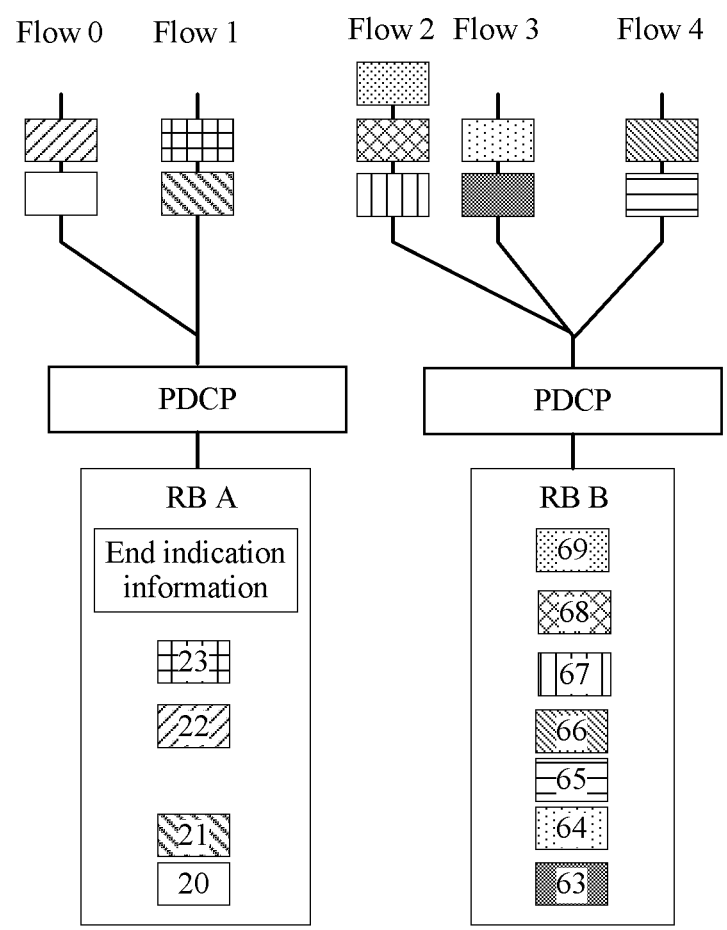

As shown in FIG. 5 (*a*) and FIG. 5 (*b*), FIG. 5 (*a*) and FIG. 5 (*b*) are schematic flowcharts of a data processing method according to an embodiment of this application.

In FIG. 5 (*a*) and FIG. 5 (*b*), a PDCP layer and an RLC layer are used as an embodiment for description, but the solution in this embodiment of this application is not limited to these layers. In FIG. 5 (*a*), five flows are originally mapped to two RBs: a flow 0 (flow 0), a flow 1 (flow 1), and a flow 2 (flow 2) are mapped to an RB A, and a flow 3 (flow 3) and a flow 4 (flow 4) are mapped to an RB B. After receiving a data packet of each flow, a receiver performs, through a single PDCP entity, processing such as header compression, encryption, and PDCP header addition on data packets of flows mapped to a single RB, and then forwards the data packets to an RLC entity. After reconfiguration, the flow 2 is mapped to the RB B, and mapping relationships between the other flows and the RBs remain unchanged. In this case, two data packets of the flow 2 that are received by a first device are still in an RLC buffer of the RB A, and PDCP SNs of the two data packets are 22 and 25. The two data packets may be unsent data packets, or may be data packets that are in a state in which the data packets have been sent but whether the data packets are correctly received by the receiver is not determined.

After the flow 2 is mapped to the RB B, the data packets whose PDCP SNs are 22 and 25 are still transmitted through the RB A. However, a subsequent data packet of the flow 2 needs to be transmitted through the RB B. Specifically, as shown in FIG. 5 (*b*), a data packet whose PDCP SN is 67 is transmitted on the RB B in FIG. 5 (*b*). Because a transmitter sequentially receives the data packet 22, the data packet 25, and the data packet 67 from an upper layer of the transmitter, the receiver transmits the data packets to an upper layer of the receiver in the same order. After the flow 2 is mapped to the RB B, and the transmitter completes sending of the data packet of the flow 2 whose PDCP SN is 25, the transmitter generates a control packet including end indication information and sends the control packet to the receiver on an air interface to indicate, to the receiver, that a last data packet that is of the flow 2 and that is sent by the transmitter through the RB A is the data packet whose PDCP SN is 25.

In this embodiment of this application, after an RB to which a flow is mapped changes, the first device may further transmit, through a changed RB, a data packet that is of the flow and that has been received but is not transmitted.

Specifically, with reference to FIG. 5 (a) and FIG. 5 (b), as shown in FIG. 5 (c), FIG. 5 (c) is a schematic flowchart of a data processing method according to an embodiment of this application. In FIG. 5 (c), the transmitter reprocesses "data packets 24 and 25 that are not transmitted on the air interface" of the flow 2 through the PDCP entity, and transmits the processed data packets 24 and 25 through the changed RB B to which the flow 2 is mapped. The reprocessing performed by the PDCP entity described herein includes PDCP SN re-allocation, re-encryption, header recompression, and the like. In this way, the transmitter may send the end indication information in advance, that is, the transmitter sends the end indication information after completing sending of the last data packet of the flow 2 on the RB A. After receiving the end indication information, the receiver may determine a time of transmitting the data packet of the flow 2 to the upper layer. In addition to "packets 24 and 25 that are not transmitted on the air interface", the transmitter needs to reprocess another data packet if a PDCP SN of other data packet is affected. For example, PDCP SN re-allocation, re-encryption, and header recompression need to be performed on a data packet 23 of the flow 0 and a data packet 24 of the flow 1 in FIG. 5 (a).

Because an existing LTE system is based on bearer transmission, a data packet is received by an access network device in the system on a wired interface in units of RBs, and a data packet is sent on an air interface in units of RBs. An access network device of this type is referred to as an RB-RB type below. An NR (new radio) system is based on flow transmission. A data packet is received by an access network device in the system on a wired interface in units of flows, and a data packet is sent on an air interface in units of RBs. An access network device of this type is referred to as a flow-RB type below. It should be noted that when the data packet is transmitted on the air interface, the transmitter determines a tunnel for data packets of a same RB or a same flow, and sends the data packets of the same RB or the same flow through the determined tunnel. The tunnel is usually identified by using a tunnel endpoint identifier (TEID).

When a terminal is handed over, there may be a plurality of combinations between a source access network device currently accessed by the terminal and a target access network device to which the terminal is to be handed over, and all possible combinations may be shown in Table 1. It should be noted that the scenario shown in Table 1 may be a scenario in which the access network device in the LTE system and the access network device in the NR system coexist in a network, and certainly there may be another scenario. This is not limited in this application.

TABLE 1

|  | Source access network device type | Target access network device type |
| --- | --- | --- |
| Scenario 1 | RB-RB | RB-RB |
| Scenario 2 | flow-RB | flow-RB |
| Scenario 3 | flow-RB | RB-RB |
| Scenario 4 | RB-RB | flow-RB |

In the scenario 1, the terminal is handed over in the LTE system, and this belongs to the prior art. Details are not described in this embodiment of this application. With reference to the foregoing description, in the scenarios 2, 3, and 4, access network devices in different systems use different granularities during data packet processing (the LTE system is based on an RB level and the NR system is based on a flow level). Therefore, currently, there is no effective solution for converting an RB-level data packet into a flow-level data packet or converting a flow-level data packet into an RB-level data packet between the source access network device and the target access network device when the terminal is handed over.

Figure 6:
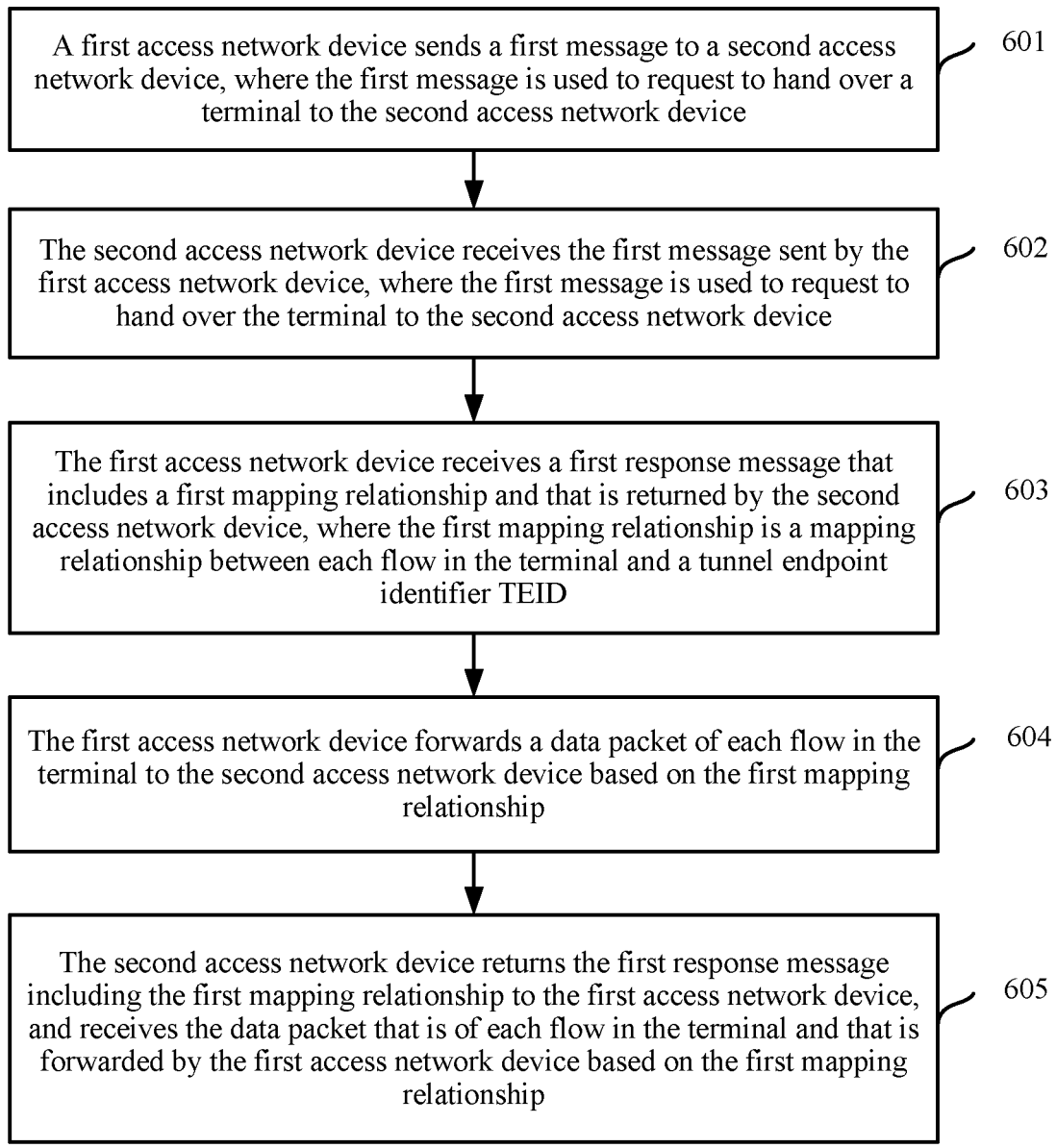
FIG. 6 is a schematic flowchart of a data processing method according to an embodiment of this application.

Based on the foregoing description, as shown in FIG. 6, FIG. 6 is a schematic flowchart of a data processing method according to an embodiment of this application.

Referring to FIG. 6, the method includes the following steps:

Step 601: A first access network device sends a first message to a second access network device, where the first message is used to request to hand over a terminal to the second access network device.

Step 602: The second access network device receives the first message sent by the first access network device, where the first message is used to request to hand over the terminal to the second access network device.

Step 603: The first access network device receives a first response message that includes a first mapping relationship and that is returned by the second access network device, where the first mapping relationship is a mapping relationship between each flow in the terminal and a tunnel endpoint identifier TEID.

It should be noted that the first mapping relationship may be determined by the second access network device or a core network device that is located in a same network as the second access network device. This may be specifically determined based on an actual situation, and details are not described herein.

Step 604: The first access network device forwards a data packet of each flow in the terminal to the second access network device based on the first mapping relationship.

Step 605: The second access network device returns the first response message including the first mapping relationship to the first access network device, and receives the data packet that is of each flow in the terminal and that is forwarded by the first access network device based on the first mapping relationship.

Before step 601, the first access network device may receive a measurement report sent by the terminal. It should be noted that the terminal is a terminal that accesses the first access network device.

The first access network device performs a handover decision according to a handover algorithm after receiving the measurement report, and performs step 601 after determining that a handover needs to be performed.

In step 601, the first message sent by the first access network device may further include at least one of the following:

a second mapping relationship, where the second mapping relationship is a mapping relationship that is between each flow and an RB and that is used by the terminal in a network in which the first access network device is located;

a fourth mapping relationship, where the fourth mapping relationship is a mapping relationship that is between each flow and a TEID and that is used by the terminal in the network in which the first access network device is located; and at least one flow AMBR (aggregate maximum bit rate) value corresponding to each flow, where a plurality of flows may be corresponding to a single flow AMBR, that is, a group of flows may be corresponding to one flow AMBR.

In step 603, the first response message may further include a third mapping relationship, and the third mapping relationship is a mapping relationship that is between a flow and an RB and that is determined by the second access network device for each flow in the terminal or a mapping relationship that is between a flow and an RB and that is determined by a core network device corresponding to the second access network device for each flow in the terminal. Similar to the first mapping relationship, the third mapping relationship further includes TEIDs separately allocated to uplink data and downlink data.

It should be noted that in this embodiment of this application, the second mapping relationship may be the same as or different from the third mapping relationship. This may be specifically determined based on an actual situation, and details are not described herein. Optionally, if the second mapping relationship is different from the third mapping relationship, before forwarding the data packet of each flow in the terminal to the second access network device based on the first mapping relationship, the first access network device may further delete a data packet sequence number of the data packet of each flow in the terminal. For example, a PDCP SN of the data packet of each flow is deleted.

In step 604, if all flows in the first mapping relationship are mapped to different TEIDs, the first access network device may send the data packet of each flow to the second access network device through a tunnel The first access network device may alternatively send a data packet of each RB in the terminal to the second access network device through a tunnel. In this case, flows mapped to all RBs are mapped to a same TEID. It should be noted that the first access network device establishes a tunnel based on the first mapping relationship. Therefore, in this case, flows mapped to a same RB in the first mapping relationship are mapped to a same TEID, that is, mapped TEIDs in the first mapping relationship are the same, and flows mapped to different RBs in the third mapping relationship are mapped to different TEIDs in the first mapping relationship.

It should be noted that the first access network device may send two parts of data packets of the terminal to the second access network device. A part of data packets are data packets that are in a state in which the data packets have been sent to the terminal on an air interface but whether the data packets are correctly received by the terminal is not determined, and the other part of data packets are data packets that have not been sent to the terminal on the air interface.

Optionally, the first access network device may further send a handover command to the terminal to instruct the terminal to access the second access network device. The handover command includes the third mapping relationship.

In step 605, after receiving the data packet of each flow in the terminal, the second access network device determines, based on the second mapping relationship and the third mapping relationship, that a first RB to which a target flow is mapped in the second mapping relationship changes to a second RB. After receiving a target data packet of the target flow, the second access network device determines an RB used for sending the target data packet. The target flow is any flow in the second mapping relationship, and the target data packet is any data packet of the target flow.

In the foregoing procedure, the mapping relationship that is between a flow and an RB and that is determined by the second access network device may be the same as or different from the mapping relationship that is between each flow and an RB and that is used by the terminal in the network in which the first access network device is located. If the mapping relationship that is between a flow and an RB and that is determined by the second access network device is the same as the mapping relationship that is between each flow and an RB and that is used by the terminal in the network in which the first access network device is located, the second access network device processes a data packet of the terminal based on an original mapping relationship between a flow and an RB. Details are not described herein.

If the mapping relationship that is between a flow and an RB and that is determined by the second access network device is different from the mapping relationship that is between each flow and an RB and that is used by the terminal in the network in which the first access network device is located, four manners are available for the second access network device to determine the RB used for sending the target data packet. Detailed descriptions are provided as follows:

In a possible implementation, the second access network device sends the target data packet on the first RB if determining that the target data packet is not correctly received by a receiver of the target data packet and a data packet following the target data packet is correctly received by the receiver of the target data packet.

In a possible implementation, the second access network device sends the target data packet on the second RB if determining that the target data packet is not correctly received by a receiver of the target data packet and a data packet following the target data packet is not correctly received by the receiver of the target data packet.

In a possible implementation, the second access network device sends the target data packet on the second RB if determining that the target data packet is not correctly received by a receiver of the target data packet.

In a possible implementation, the second access network device sends the target data packet on the first RB if the second access network device cannot determine a receiving status of the target data packet.

For a data packet of a flow whose corresponding RB does not change, if some preceding data packets are moved to a new RB for transmission, the second access network device changes a data packet sequence number of a current data packet, and sends the data packet on the air interface after performing processing such as re-encryption on the data packet.

For a data packet received from a gateway, the second access network device maps a data packet of each flow to a corresponding RB based on a new mapping relationship between a flow and an RB, and then sends the data packet on the air interface. Details are not described herein.

In this embodiment of this application, the second access network device may determine a receiving status of each data packet based on a PDCP status report sent by the terminal or the first access network device. Certainly, the foregoing is merely an embodiment. The second access network device may determine the receiving status of each data packet in another manner, and details are not described herein.

According to the method provided in this embodiment of this application, before a handover, the second mapping relationship and the third mapping relationship are exchanged between the first access network device and the second access network device, so that an RB-level data packet is converted into a flow-level data packet or a flow-level data packet is converted into an RB-level data packet between a source access network device and a target access network device when the terminal is handed over.

The following describes the process in FIG. 6 in detail by using a specific embodiment.

Figure 7:
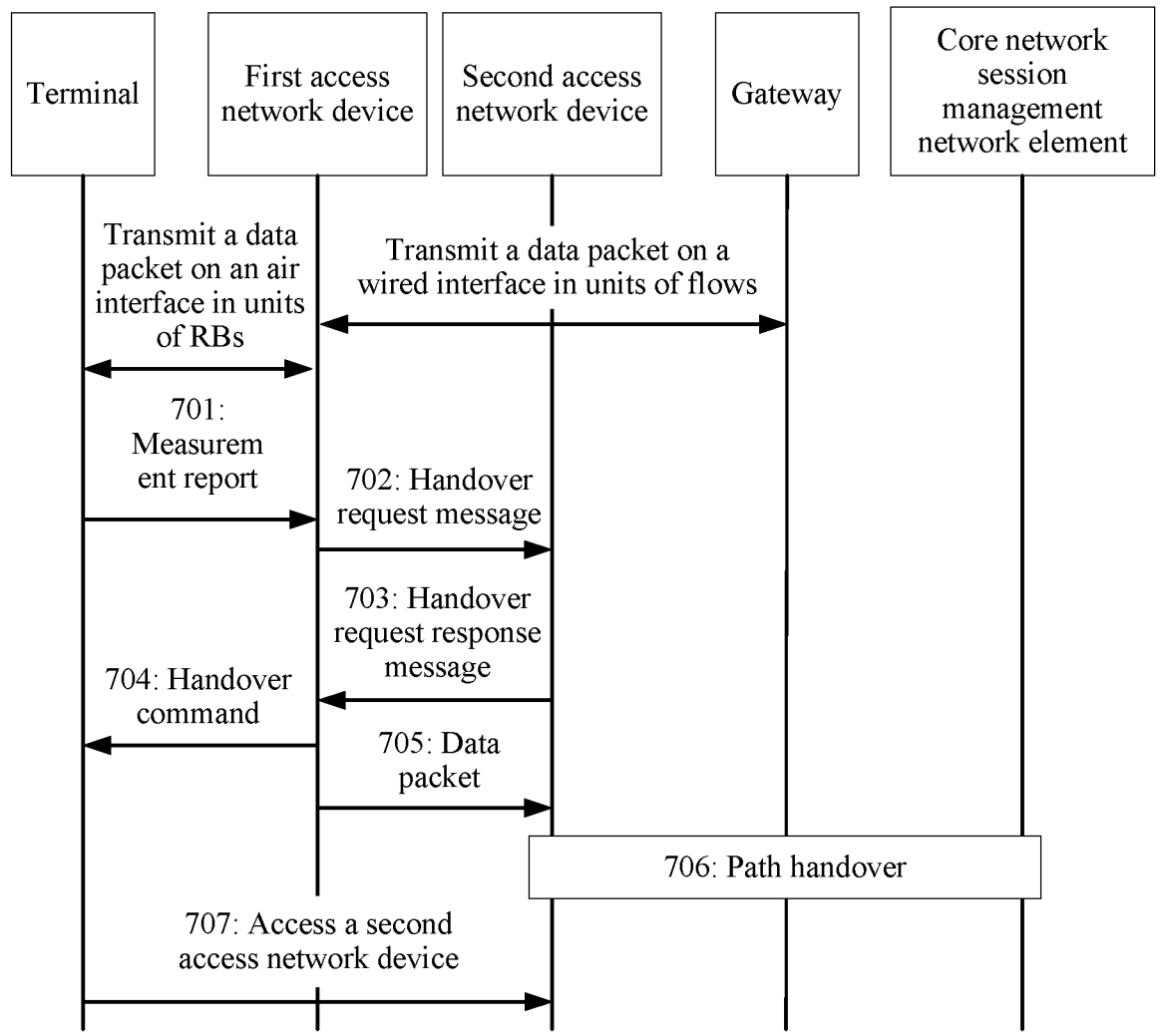
FIG. 7 is a schematic flowchart of a data handover according to an embodiment of this application.

As shown in FIG. 7, FIG. 7 is a schematic flowchart of a data handover according to an embodiment of this application.

FIG. 7 is corresponding to the comparison scenario 2 in Table 1. That is, a first access network device processes a data packet in a flow-RB manner, and a second access network device processes a data packet in a flow-RB manner.

Step 701: A terminal reports a measurement report to a first access network device.

For specific content of the measurement report, refer to descriptions in an existing standard. This is not limited in this embodiment of this application.

Step 702: The first access network device determines, based on the received measurement report, to trigger a handover procedure, and sends a first message to a second access network device.

Optionally, the first message may include the following information:

a second mapping relationship, a fourth mapping relationship, and at least one flow AMBR value corresponding to each flow.

It should be noted that the first message may not include the foregoing information, and this is specifically determined based on an actual situation.

Step 703: The second access network device returns a first response message including a first mapping relationship to the first access network device.

The first response message may further include a third mapping relationship. The third mapping relationship may be the same as or different from the second mapping relationship, and this may be specifically determined based on an actual situation.

Step 704: The first access network device sends a handover command to the terminal.

The handover command may include the third mapping relationship.

Step 705: The first access network device sends a data packet of the terminal to the second access network device.

Specifically, the first access network device may send a data packet of each flow in the terminal to the second access network device through a tunnel. In this way, the second access network device learns, based on a tunnel on which the data packet is received, a flow to which the data packet belongs.

Step 706: The second access network device performs a path handover.

The second access network device may further instruct a gateway and a core network session management network element to send a subsequent data packet of the terminal to the second access network device.

Step 707: The terminal accesses the second access network device.

Figure 8:
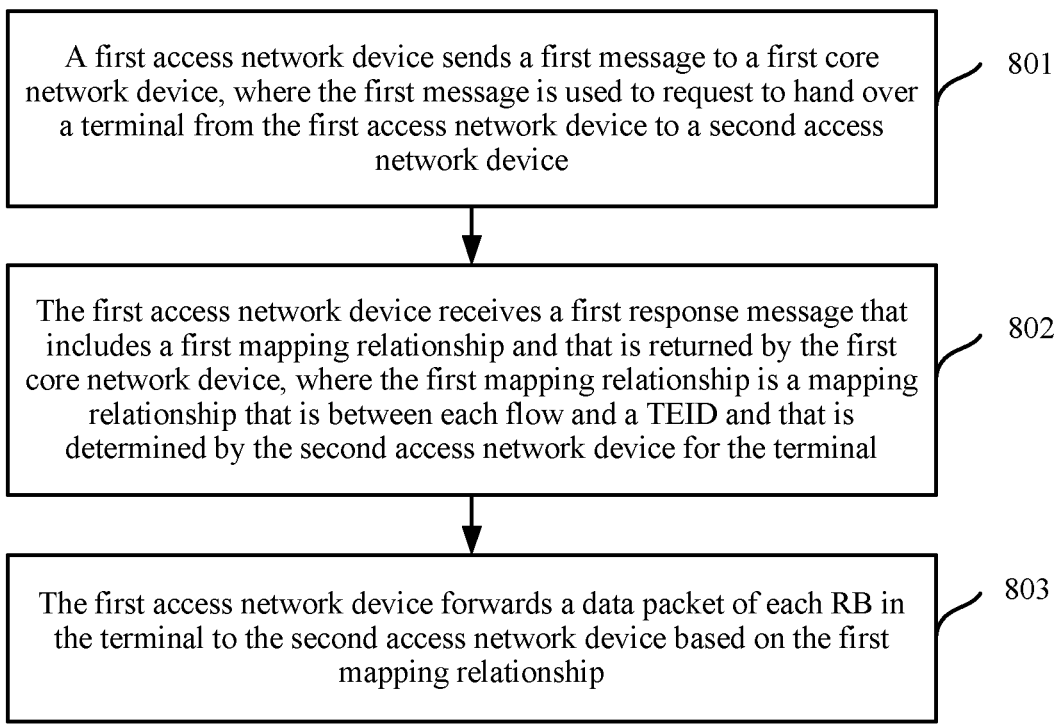
FIG. 8 is a schematic flowchart of a data processing method according to an embodiment of this application.

Based on the foregoing description, for the scenario 3 in Table 1, as shown in FIG. 8, FIG. 8 is a schematic flowchart of a data processing method according to an embodiment of this application.

Referring to FIG. 8, the method includes the following steps:

Step 801: A first access network device sends a first message to a first core network device, where the first message is used to request to hand over a terminal from the first access network device to a second access network device.

Step 802: The first access network device receives a first response message that includes a first mapping relationship and that is returned by the first core network device, where the first mapping relationship is a mapping relationship that is between each flow and a TEID and that is determined by the second access network device for the terminal.

Step 803: The first access network device forwards a data packet of each flow in the terminal to the second access network device based on the first mapping relationship.

The following describes the process in FIG. 8 by using a detailed embodiment.

Figure 9:
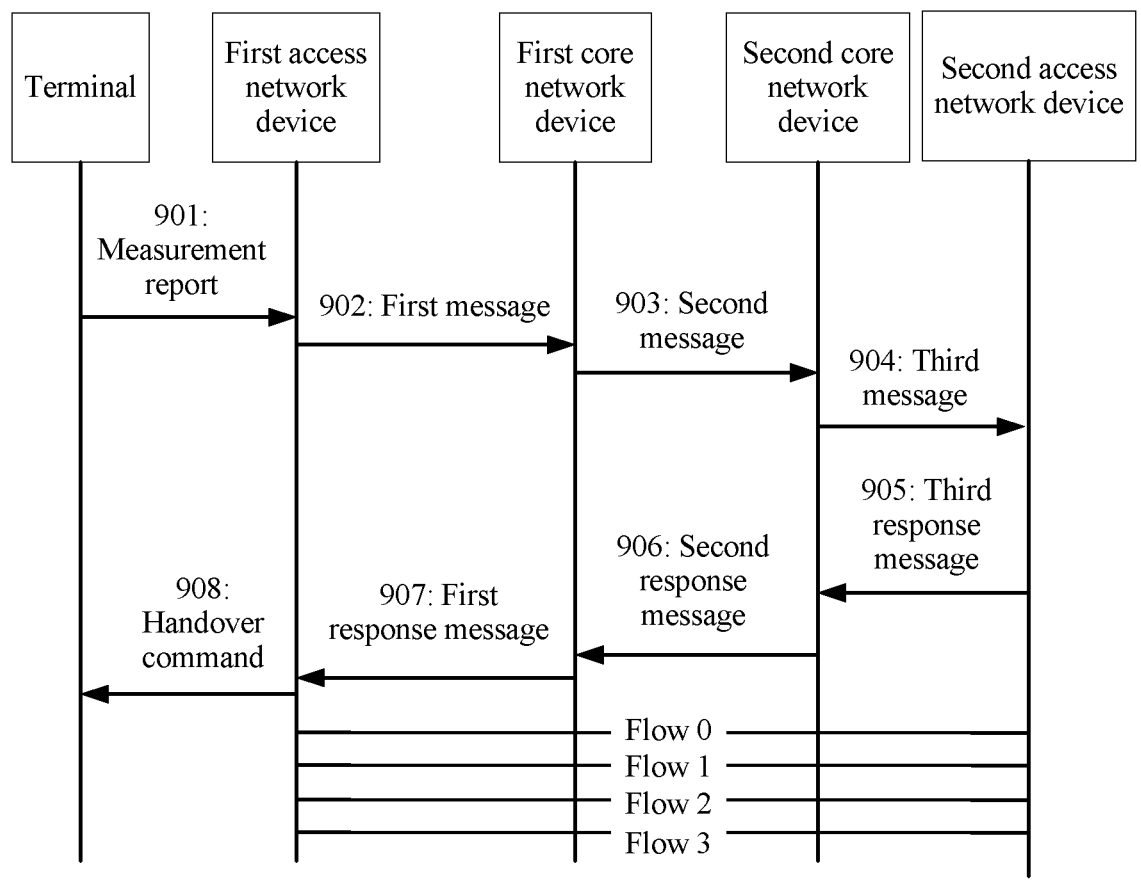
FIG. 9 is a schematic flowchart of a data handover according to an embodiment of this application.

As shown in FIG. 9, FIG. 9 is a schematic flowchart of a data handover according to an embodiment of this application.

FIG. 9 is corresponding to the comparison scenario 3 in Table 1. That is, a first access network device processes a data packet in a flow-RB manner, and a second access network device processes a data packet in an RB-RB manner.

Step 901: A terminal reports a measurement report to a first access network device.

For specific content of the measurement report, refer to descriptions in an existing standard. This is not limited in this embodiment of this application.

The terminal has four flows: a flow 0, a flow 1, a flow 2, and a flow 3.

Step 902: The first access network device determines, based on the received measurement report, to trigger a handover procedure, and sends a first message to a first core network device, where the first message is used to request to hand over the terminal to a second access network device.

The first access network device determines to establish a tunnel for each flow. In this case, the first access network device separately allocates TEIDs to uplink data and downlink data of each flow. Therefore, the first message may include a mapping relationship that is between uplink data or downlink data of each flow and a TEID and that is used by the terminal in a network in which the first access network device is located. For example, the flow 0 is mapped to a TEID 0, the flow 1 is mapped to a TEID 1, the flow 2 is mapped to a TEID 2, and the flow 3 is mapped to a TEID 3.

The first core network device is a device connected to the first access network in the network in which the first access network device is located.

Optionally, the first message may further include a mapping relationship that is between each flow and an RB and that is used by the terminal in the network in which the first access network device is located.

Step 903: After receiving the first message sent by the first access network device, the first core network device sends a second message to a second core network device, where the second message is used to request to hand over the terminal to the second access network device.

The second message may include a fourth mapping relationship, and the fourth mapping relationship is a mapping relationship that is between each flow and a TEID and that is used by the terminal in the network in which the first access network device is located. Based on the foregoing description, in this case, the fourth mapping relationship may be: the flow 0 is mapped to the TEID 0, the flow 1 is mapped to the TEID 1, the flow 2 is mapped to the TEID 2, and the flow 3 is mapped to the TEID 3.

In addition, the second message may include only one or more sets of TFT filter template parameters that are used by the first core network device and a corresponding QoS class. Specifically, one set of TFT filter template parameters include a source IP address, a source port number, a destination IP address, a destination port number, and a protocol type. After receiving a TFT template, the second core network device determines an RB quantity and a flow quantity that are provided by the second core network device for the UE, and a mapping relationship between a flow and an RB.

Step 904: After receiving the second message sent by the first core network device, the second core network device sends a third message to the second access network device, where the third message is used to request to hand over the terminal to the second access network device.

When receiving the second message, the second core network device may further determine an RB to which each flow is mapped in the terminal in a network in which the second access network device is located, to be specific, a third mapping relationship. For example, the second core network device determines two RBs: an RB A and an RB B, and the third mapping relationship determined by the second core network device is: the flow 0 and the flow 1 are mapped to the RB A, and the flow 2 and the flow 3 are mapped to the RB B.

In this case, the third message may include the following mapping relationship: the flow 0 is mapped to the TEID 0, the flow 1 is mapped to the TEID 1, the flow 2 is mapped to the TEID 2, the flow 3 is mapped to the TEID 3, the flow 0 and the flow 1 are mapped to the RB A, and the flow 2 and the flow 3 are mapped to the RB B.

Step 905: The second access network device sends a third response message to the second core network device.

After receiving the third message, the second access network device determines, in a manner of mapping each flow to one TEID, to receive a data packet sent by the first access network device, and determines a mapping relationship that is between a flow and a TEID and that is used by the terminal in the network in which the second access network is located, to be specific, the first mapping relationship. In this case, the first mapping relationship may be: the flow 0 is mapped to a TEID 0', the flow 1 is mapped to a TEID 1', the flow 2 is mapped to a TEID 2', and the flow 3 is mapped to a TEID 3'.

The second access network device sends the foregoing mapping relationship to the first access network device through the third response message.

Step 906: The second core network device sends a second response message to the first core network device.

The second response message may include the first mapping relationship and the third mapping relationship.

Step 907: The first core network device sends a first response message to the first core network device.

The first response message may include the first mapping relationship and the third mapping relationship.

Step 908: The first access network device sends a handover command to the terminal.

The handover command may include the third mapping relationship.

Finally, the first access network device sends a data packet of each flow in the terminal to the second access network device through a tunnel based on the first mapping relationship. In this way, the second access network device learns, based on a tunnel on which the data packet is received, a flow to which the data packet belongs.

In the procedure shown in FIG. 9, the second access network device may request the first access network device to "establish a tunnel for each RB". In this case, in step 905, the second access network device may determine a same TEID for flows mapped to a same RB, that is, the first mapping relationship determined by the second access network device may be: the flow 0 is mapped to the TEID 0', the flow 1 is mapped to the TEID 0', the flow 2 is mapped to the TEID 1', and the flow 3 is mapped to the TEID 1'.

Then, the second access network device sends the foregoing mapping relationship to the first access network device through the third response message.

In the scenario 3 shown in FIG. 9, data packet processing by the second access network device may specifically include four cases shown in Table 2:

TABLE 2

| | Manner of forwarding a data packet by the first access network device | Whether the second mapping relationship is the same as the third mapping relationship |
|---|---|---|
| Case 1 | Forward data in units of flows | Same |
| Case 2 | Forward data in units of flows | Different |
| Case 3 | Forward data in units of RBs | Same |
| Case 4 | Forward data in units of RBs | Different |

The following describes in detail the four cases in Table 2:

Case 1: After receiving a data packet from each tunnel, the second access network device converges received data packets to corresponding RBs based on a mapping relationship that is between a flow and an RB and that is determined by a core network device corresponding to the second access network device for each flow in the terminal. In this case, data packet processing is exactly the same as data packet processing in an existing handover procedure in LTE, and details are not described herein.

Case 2: After receiving a data packet from each tunnel, the second access network device converges received data packets to corresponding RBs based on a mapping relationship that is between a flow and an RB and that is determined by a core network device corresponding to the second access network device for each flow in the terminal, and then processes the data packet in at least one of the four possible implementations described above.

Optionally, for flows in which RBs to which the flows are mapped change, the terminal determines, based on a PDCP status report generated by the second access network device, an RB to which a data packet is to be transmitted. Specifically, for a "hole" data packet in the PDCP status report, the terminal sends the hole data packet through an RB existing before the RB to which the flow is mapped changes. For a data packet that is not a "hole" data packet in the PDCP status report, the terminal sends, through an RB obtained after the RB to which the flow is mapped changes, data packets that are not "hole" data packets. If the terminal does not receive the PDCP status report, all data packets are transmitted on the RB obtained after the RB to which the flow is mapped changes.

Case 3: From a perspective of the first access network device, data packets of a plurality of flows need to be converged to a tunnel, and forwarded to the second access network device. Because the second mapping relationship is the same as the third mapping relationship, from a perspective of the second access network device, a data packet from each tunnel is transmitted on a corresponding RB. Specific data packet processing is the same as data packet processing in a handover procedure in LTE, and details are not described herein.

Case 4: The first access network device transmits a data packet to the second access network device through a tunnel based on the third mapping relationship. For example, in the second mapping relationship, the flow 0 and the flow 1 are originally mapped to the RB A, and the flow 2 and the flow 3 are originally mapped to the RB B. On the second access network device side, the third mapping relationship is: the flow 0 and the flow 3 are mapped to the RB A, and the flow 1 and the flow 2 are mapped to the RB B. Based on the third mapping relationship, the first access network device forwards data packets of the flow 0 and the flow 3 through a tunnel corresponding to the RB A, and forwards data packets of the flow 1 and the flow 2 through a tunnel corresponding to the RB B. In a data packet forwarding process, the first access network device does not send a data packet sequence number of each data packet. After the data packet arrives at the second access network device, the second access network device re-allocates a data packet sequence number to each data packet.

Figure 10:
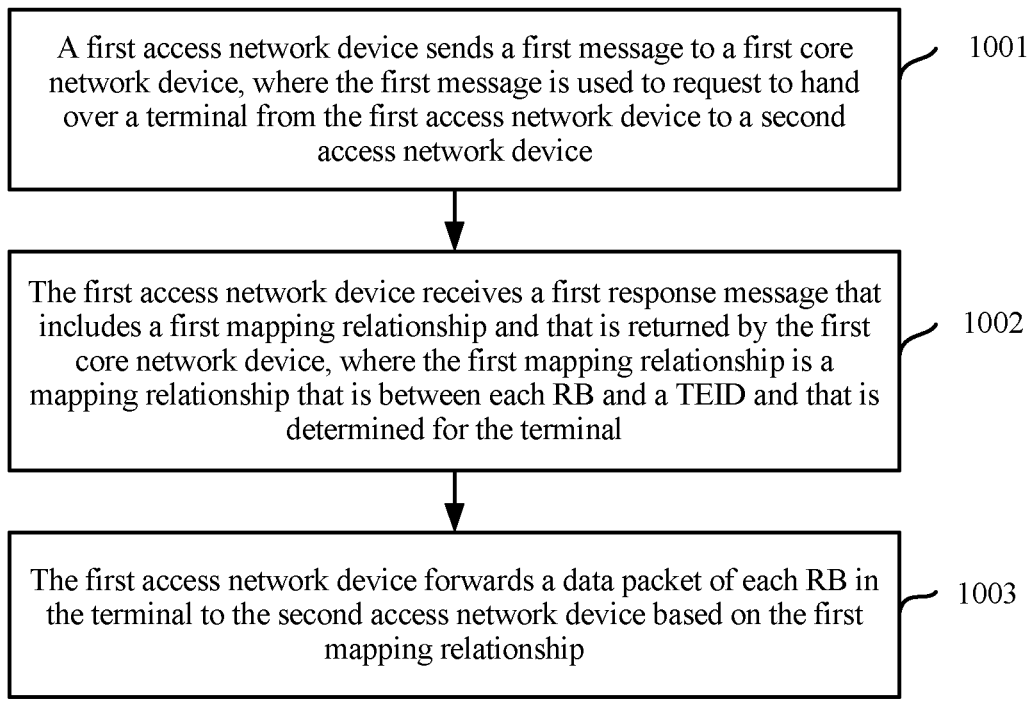
FIG. 10 is a schematic flowchart of a data processing method according to an embodiment of this application.

Based on the foregoing description, for the scenario 4 in Table 1, as shown in FIG. 10, FIG. 10 is a schematic flowchart of a data processing method according to an embodiment of this application.

Referring to FIG. 10, the method includes the following steps:

Step 1001: A first access network device sends a first message to a first core network device, where the first message is used to request to hand over a terminal from the first access network device to a second access network device.

Step 1002: The first access network device receives a first response message that includes a first mapping relationship and that is returned by the first core network device, where the first mapping relationship is a mapping relationship that is between each RB and a TEID and that is determined by the second access network device for the terminal.

Step 1003: The first access network device forwards a data packet of each RB in the terminal to the second access network device based on the first mapping relationship.

Before step 1001, the first access network device may receive a measurement report sent by the terminal.

The first access network device performs a handover decision according to a handover algorithm after receiving the measurement report, and performs step 1001 after determining that a handover needs to be performed.

In step 1001, the first message sent by the first access network device may further include at least one of the following:

a fourth mapping relationship, where the fourth mapping relationship is a mapping relationship that is between each RB and a TEID and that is used by the terminal in a network in which the first access network device is located.

After receiving the first message, the first core network device sends a second message to a second core network device. The second message may include the following content:

the fourth mapping relationship, and a TFT (traffic flow template) template used by each RB in the terminal in a network in which the first core network device is located. In addition, the second message may include only one or more sets of TFT filter template parameters that are used by the first core network device and a corresponding QoS class. Specifically, one set of TFT filter template parameters include a source IP address, a source port number, a destination IP address, a destination port number, and a protocol type. After receiving a TFT template, the second core network device determines an RB quantity and a flow quantity that are provided by the second core network device for the terminal, and a mapping relationship between a flow and an RB.

After receiving the second message, the second core network device may determine a second mapping relationship based on the TFT template used by each RB in the terminal in the network in which the first core network device is located and a TFT template used by each RB in the terminal in a network in which the second core network device is located. The second mapping relationship is a mapping relationship that is between each flow and an RB and that is used by the terminal in the network in which the first access network device is located.

Then the second core network device sends a third message including the second mapping relationship to the second access network device, and the third message is used to request to hand over the terminal from the first access network device to the second access network device. The third message may further include the TFT template used by each RB in the terminal in the network in which the second core network device is located.

After receiving the third message that includes the second mapping relationship and that is sent by the second core network device, the second access network device returns a third response message including the first mapping relationship to the second core network device. The first mapping relationship is the mapping relationship that is between each RB and a TEID and that is determined by the second access network device for the terminal.

All RBs in the first mapping relationship are mapped to a same TEID, or all RBs in the first mapping relationship are mapped to different TEIDs.

Optionally, the third response message further includes mapping relationship mapping indication information, and the mapping relationship mapping indication information is used to indicate that a mapping relationship that is between each RB and a flow, determined by the second access network device, and used by the terminal in a network in which the second access network device is located is the same as the second mapping relationship.

Further, the third response message may further include a sequence indication message, and the sequence indication message is used to indicate that a data packet of the terminal that is forwarded by the first access network device to the second access network device carries a data packet sequence number allocated by the first access network device. The data packet sequence number may be a PDCP SN.

After receiving the third response message that includes the first mapping relationship and that is returned by the second access network device, the second core network device sends a second response message to the first core network device. The second response message includes the first mapping relationship.

In step 1002, after receiving the first response message, the first access network device sends a handover command to the terminal to instruct the terminal to access the second access network device.

In step 1003, when forwarding the data packet of each RB in the terminal to the second access network device, the first access network device may simultaneously send a data packet sequence number of each data packet to the second access network device. Certainly, the first access network device may not send the data packet sequence number of each data packet. This is specifically determined based on an actual situation.

It should be noted that the data packet sent by the first access network device to the second access network device may include two types of data packets. One type of data packet is a data packet that is in a state in which the data packet has been sent to the terminal on an air interface but whether the data packet is correctly received by the terminal is not determined, and the other type of data packet is a data packet that has not been sent to the terminal on the air interface.

The following describes the process in FIG. 10 by using a detailed embodiment.

Figure 11:
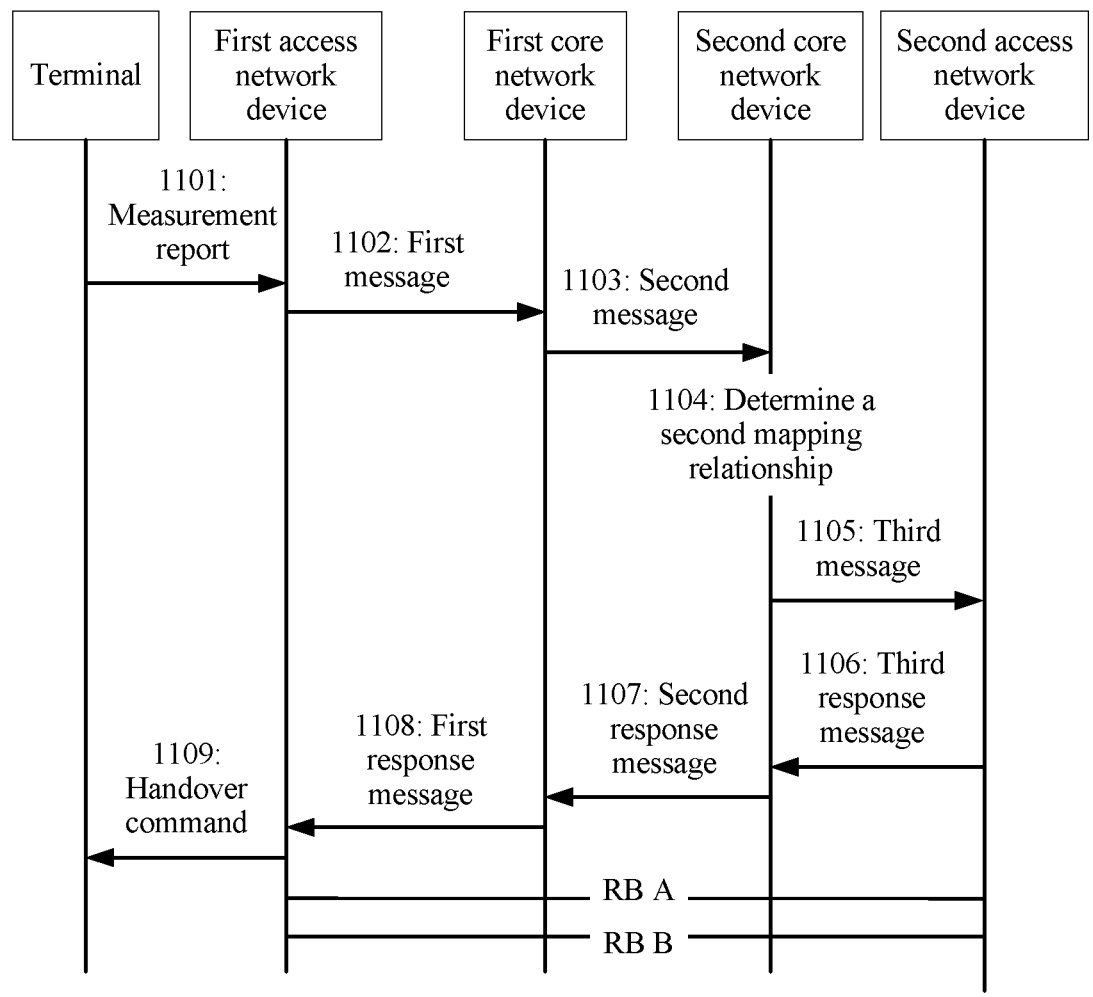
FIG. 11 is a schematic flowchart of a data handover according to an embodiment of this application.

As shown in FIG. 11, FIG. 11 is a schematic flowchart of a data handover according to an embodiment of this application.

FIG. 11 is corresponding to the comparison scenario 4 in Table 1. That is, a first access network device processes a data packet in an RB-RB manner, and a second access network device processes a data packet in a flow-RB manner.

Step 1101: A terminal reports a measurement report to a first access network device.

For specific content of the measurement report, refer to descriptions in an existing standard. This is not limited in this embodiment of this application.

For example, the terminal has four flows: a flow 0, a flow 1, a flow 2, and a flow 3. The flow 0 and the flow 1 are mapped to an RB A, and the flow 2 and the flow 3 are mapped to an RB B.

Step 1102: The first access network device determines, based on the received measurement report, to trigger a handover procedure, and sends a first message to a first core network device, where the first message is used to request to hand over the terminal to a second access network device.

The first access network device determines to establish a tunnel for each RB. In this case, the first access network device allocates one TEID to each RB. Therefore, the first message may include a fourth mapping relationship, that is, a mapping relationship that is between each RB and a TEID and that is used by the terminal in a network in which the first access network device is located. For example, the RB A is mapped to a TEID 0 and the RB B is mapped to a TEID 1.

Step 1103: After receiving the first message sent by the first access network device, the first core network device sends a second message to a second core network device, where the second message is used to request to hand over the terminal to the second access network device.

The second message may include the mapping relationship that is between each RB and a TEID and that is used by the terminal in the network in which the first access network device is located, and a TFT template used by each RB in the terminal in a network in which the first core network device is located.

Step 1104: The second core network device determines a second mapping relationship.

The second core network device may determine the second mapping relationship based on the TFT template used by each RB in the terminal in the network in which the first core network device is located and a TFT template used by each RB the terminal in a network in which the second core network device is located. That is, the second core network device determines that the flow 0 and the flow 1 are mapped to the RB A, and the flow 2 and the flow 3 are mapped to the RB B.

Step 1105: The second core network device sends a third message to the second access network device, where the third message is used to request to hand over the terminal to the second access network device.

The third message may include the second mapping relationship and the fourth mapping relationship.

Step 1106: The second access network device sends a third response message to the second core network device.

After receiving the third message, the second access network device determines, in a manner of mapping each RB to one TEID, to receive a data packet sent by the first access network device, and determines the TEID mapped to each RB on the second access network device side, to be specific, a first mapping relationship.

The first mapping relationship may be: the RB A is mapped to a TEID 0' and the RB B is mapped to a TEID 1'.

The second access network device sends the foregoing mapping relationship to the first access network device through the third response message.

Step 1107: The second core network device sends a second response message to the first core network device.

The second response message may include the first mapping relationship.

Step 1108: The first core network device sends a first response message to the first access network device.

The first response message may include the first mapping relationship.

Step 1109: The first access network device sends a handover command to the terminal.

Finally, the first access network device sends a data packet of each RB in the terminal to the second access network device through a tunnel based on the first mapping relationship. In this way, the second access network device learns, based on a tunnel on which the data packet is received, a flow to which the data packet belongs.

In the procedure shown in FIG. 10, after receiving the third message, the second access network device may determine, based on the second mapping relationship, whether a mapping relationship that is between a flow and an RB and that is used by the terminal in a network in which the second access network device is located is the same as a mapping relationship that is between a flow and an RB and that is used by the terminal in the network in which the first access network device is located. If the mapping relationship that is between a flow and an RB and that is used by the terminal in the network in which the second access network device is located is the same as the mapping relationship that is between a flow and an RB and that is used by the terminal in the network in which the first access network device is located, the second access network device adds mapping relationship mapping indication information to the third response message sent in step 1106. The mapping relationship mapping indication information is used to indicate that the mapping relationship that is between each RB and a flow, determined by the second access network device, and used by the terminal in the network in which the second access network device is located is the same as the second mapping relationship.

In addition, the second access network device adds a sequence indication message to the third response message sent in step 1106, and the sequence indication message is used to indicate that a data packet of the terminal that is forwarded by the first access network device to the second access network device carries a data packet sequence number allocated by the first access network device. Therefore, the first access network device is requested to add a data packet sequence number of each data packet when performing data packet forwarding, and a data packet processing process in the entire handover procedure is exactly the same as that of a handover in LTE.

Optionally, in the procedure in FIG. 11, the first access network device may map all RBs to a same TEID, that is, data packets of all the RBs are forwarded to the second access network device through a tunnel. After receiving the forwarded data packet, the second access network device uses the TFT template used by each RB in the terminal in the network in which the second core network device is located to filter the received data packet to obtain a plurality of flows, and then performs transmission in the network in which the second core network device is located.

Optionally, in the procedure in FIG. 11, the first access network device may map all RBs to a same TEID, that is, data packets of all the RBs are forwarded to the second access network device through a tunnel. The third response message sent by the second access network device in step 1106 carries a sequence indication message, to request the first access network device to add a data packet sequence number of each data packet when performing data packet forwarding. After the second access network device receives a data packet, the second access network device deletes a data packet sequence number that is of the data packet of each RB in the terminal and that is allocated by the first access network. Then the second access network device determines an RB to which a data packet of each flow belongs. For the data packet of each RB, the second access network device performs data convergence processing on the data packet of each RB by using the data packet sequence that is of each data packet and that is allocated by the first access network. Specifically, the second access network device may use the TFT template used by each RB in the terminal in the network in which the second core network device is located to filter a received data packet to obtain a plurality of flows. Then the second access network device determines, by using the TFT template used by each RB in the terminal in the network in which the first core network device is located, an RB to which a data packet of each flow belongs, then performs data convergence processing such as PDCP processing based on the data packet sequence number allocated by the first access network device to each data packet, and performs transmission on an air interface.

When allocating an uplink resource to the terminal, an access network device allocates a physical resource, and specifies an MCS value used by the terminal. Once the two parameters are determined, a success probability of transmitting uplink data by the terminal is determined. Generally, the transmission success probability is 90%. A MAC layer of the terminal multiplexes data of all RBs. In other words, transmission success probabilities provided by the MAC layer for all the RBs are the same. Based on this idea, when a MAC entity multiplexes the data of all the RBs, only relative priorities of all the RBs may be considered, and reliability of bottom-layer transmission resources is not considered.

In a 5G system, to implement more refined transmission, when allocating the uplink resource to the terminal, the access network device may determine a transmission success probability of correctly transmitting data on the uplink resource allocated to the terminal, and notify the terminal of the transmission success probability, thereby improving resource utilization.

Figure 12:
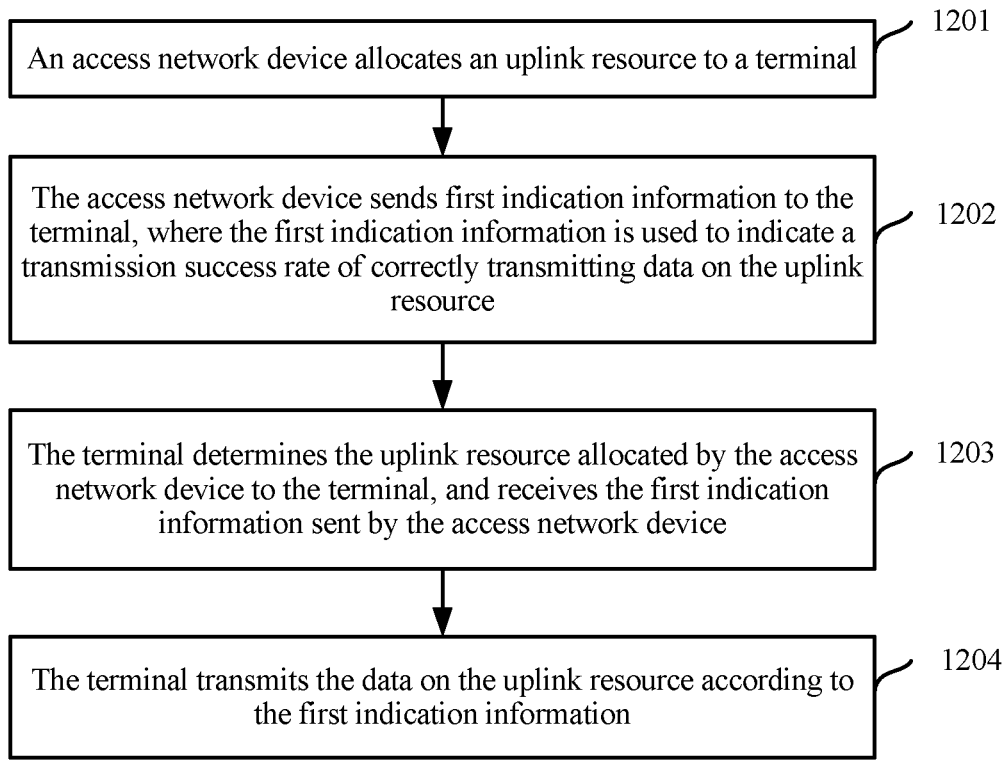
FIG. 12 is a schematic flowchart of a data processing method according to an embodiment of this application.

Based on the foregoing description, as shown in FIG. 12, FIG. 12 is a schematic flowchart of a data processing method according to an embodiment of this application.

Referring to FIG. 12, the method includes the following steps:

Step 1201: An access network device allocates an uplink resource to a terminal.

Step 1202: The access network device sends first indication information to the terminal, where the first indication information is used to indicate a transmission success rate of correctly transmitting data on the uplink resource.

Step 1203: The terminal determines the uplink resource allocated by the access network device to the terminal, and receives the first indication information sent by the access network device.

Step 1204: The terminal transmits the data on the uplink resource according to the first indication information.

In step 1201, the access network device may allocate the uplink resource to the terminal after receiving a resource request sent by the terminal. The resource request sent by the terminal may be a schedule request (SR), or may be a message for requesting the uplink resource, such as a buffer status report (BSR). This is not limited in this embodiment of this application. Certainly, the access network device may allocate the uplink resource to the terminal in another case, and details are not described herein.

In step 1202, as described above, once the uplink resource allocated by the access network device to the terminal and a specified MCS value used by the terminal are determined, a success probability of transmitting uplink data by the terminal on the uplink resource is determined. In this case, how the access network device determines the transmission success rate of correctly transmitting the data on the uplink resource is not limited in this embodiment of this application.

In this embodiment of this application, the first indication information may be a specific value of the transmission success rate.

The first indication information may alternatively be an index value, and the index value is corresponding to a specific value of the transmission success rate. In this manner, in a possible implementation, the access network device may send a comparison table to the terminal in advance by using dedicated signaling. The comparison table includes a plurality of index values, and each index value is corresponding to one transmission success probability. When allocating an uplink transmission resource, the access network device only needs to indicate the index value. Tables used by all terminals in a same cell may be different or may be the same, and this is not limited in this embodiment of this application.

In a possible implementation, the access network device sends a comparison table to the terminal by using broadcast signaling. The comparison table includes a plurality of index values, and each index value is corresponding to one transmission success probability. When allocating an uplink transmission resource, the access network device only needs to indicate the index value.

In a possible implementation, a comparison table may be stipulated according to a protocol. The comparison table includes a plurality of index values, and each index value is corresponding to one transmission success probability.

Optionally, the access network device may determine configuration information of an RB when configuring the RB for the terminal. In this case, the configuration information indicates, to the terminal, that a data packet of the configured RB can be transmitted only by using a resource whose transmission success probability is greater than a preset threshold. In this way, the terminal may determine, according to configuration information of each RB, a resource used for transmitting a data packet of each RB.

It should be noted that the access network device may add both uplink resource allocation indication information sent to the terminal and the first indication information to a same message for sending, or may separately send the uplink resource allocation indication information and the first indication information. This is not limited in this embodiment of this application. The uplink resource allocation indication information is used to indicate, to the terminal, the uplink resource allocated to the terminal.

In step 1203, how the terminal determines the uplink resource allocated by the access network device to the terminal is not limited in this embodiment of this application.

Finally, in step 1204, when a MAC entity of the terminal generates an uplink data transport block, the transmission success rate indicated by the first indication information is considered. For example, if the terminal learns that the success probability corresponding to the uplink resource obtained by the terminal is higher, the terminal sends data of a service with a high priority and a low delay budget; if the terminal learns that the success probability corresponding to the uplink resource obtained by the terminal is lower, the terminal sends data of a service with a low priority and a high delay budget.

For example, if the terminal determines that the transmission success rate indicated by the first indication information is greater than a first threshold, the terminal transmits, on the uplink resource, data corresponding to a service whose transmission priority is greater than a first preset priority; if the terminal determines that the transmission success rate indicated by the first indication information is less than a second threshold, the terminal transmits, on the uplink resource, data corresponding to a service whose transmission priority is less than a second preset priority. The first threshold and the second threshold may be determined based on an actual situation. This is not limited in this embodiment of this application.

It should be noted that the foregoing solution not only can be applied to a scenario in which the access network device dynamically allocates a resource, but also can be applied to a semi-persistent resource allocation scenario. For example, the access network device pre-allocates a set of some radio resources, and the radio resources are corresponding to different transmission success probabilities. When transmitting data by using a specific radio resource, the terminal first determines a transmission success probability corresponding to the radio resource, and then determines, based on the transmission success probability corresponding to the radio resource, a specific RB whose data can be transmitted by using the radio resource.

In the embodiments provided in the present invention, the data processing method provided in the embodiments of the present invention is described separately from a perspective of each network element and from a perspective of interaction between network elements. It can be understood that, to implement the foregoing functions, each network element such as a terminal or a base station includes a corresponding hardware structure and/or software module for performing each function. Persons skilled in the art should be easily aware that, with reference to units and algorithm steps described in the embodiments disclosed in this specification, the present invention can be implemented in a form of hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of the present invention.

Based on a same technical concept, an embodiment of this application further provides a data processing apparatus. The apparatus may execute the method procedure in FIG. 1, and may execute functions implemented by the first device in the method procedures in FIG. 2 and FIG. 3.

Figure 13:
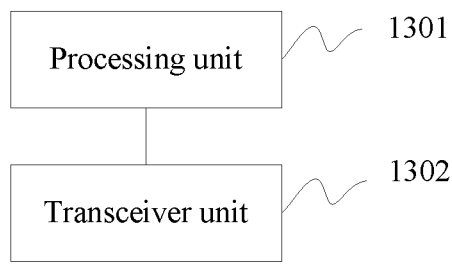
FIG. 13 is a schematic structural diagram of a data processing apparatus according to an embodiment of this application.

As shown in FIG. 13, FIG. 13 is a schematic structural diagram of a data processing apparatus according to an embodiment of this application.

Referring to FIG. 13, the apparatus includes:

a processing unit 1301, configured to: determine a flow to which a data packet belongs, and determine a flow identifier based on the flow to which the data packet belongs; and a transceiver unit 1302, configured to send the data packet including the flow identifier to a second access network device.

The processing unit 1301 is specifically configured to:

allocate the flow identifier to the data packet based on the flow to which the data packet belongs; or determine, from a flow identifier list sent by a third device, the flow identifier corresponding to the flow to which the data packet belongs.

For other content of the apparatus in FIG. 13, refer to FIG. 1 and related descriptions of FIG. 1. Details are not described herein again.

Based on a same technical concept, an embodiment of this application further provides a data processing apparatus. The apparatus may execute the method procedure in FIG. 4, and may execute functions implemented by the first device in the method procedure in FIG. 5.

Figure 14:
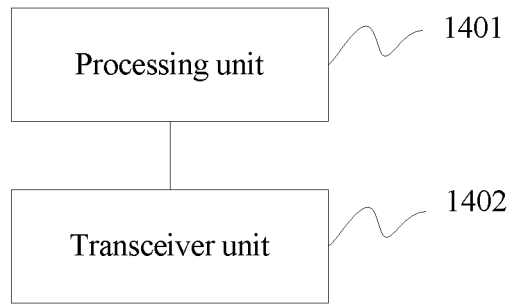
FIG. 14 is a schematic structural diagram of a data processing apparatus according to an embodiment of this application.

As shown in FIG. 14, FIG. 14 is a schematic structural diagram of a data processing apparatus according to an embodiment of this application.

Referring to FIG. 14, the apparatus includes:

a processing unit 1401, configured to determine an end data packet after a radio bearer RB to which a first flow is mapped changes from a first RB to a second RB, where the end data packet is a last data packet that is of the first flow and that is sent by a first device through the first RB; and a transceiver unit 1402, configured to send end indication information and the end data packet to a second device, where the end indication information is used to indicate that the first device has completed sending of data packets of the first flow through the first RB.

For other content of the apparatus in FIG. 14, refer to FIG. 4 and related descriptions of FIG. 4. Details are not described herein again.

Based on a same technical concept, an embodiment of this application further provides a data processing apparatus. The apparatus may execute the method procedure in FIG. 4, and may execute functions implemented by the second device in the method procedure in FIG. 5.

Figure 15:
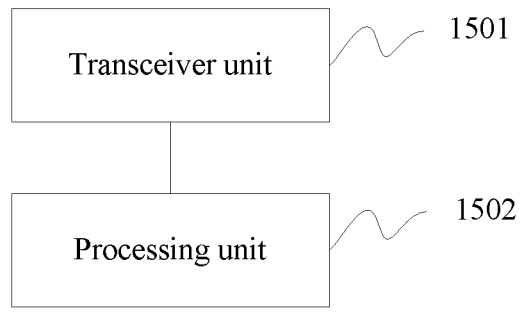
FIG. 15 is a schematic structural diagram of a data processing apparatus according to an embodiment of this application.

As shown in FIG. 15, FIG. 15 is a schematic structural diagram of a data processing apparatus according to an embodiment of this application.

Referring to FIG. 15, the apparatus includes:

a transceiver unit 1501, configured to receive end indication information sent by a first device, where the end indication information is sent after the first device has completed sending of a last data packet of a first flow through a first radio bearer RB, and the end indication information is used to indicate that the first device has completed sending of data packets of the first flow through the first RB; and a processing unit 1502, configured to process a data packet that is of the first flow and that is received through the second RB.

For other content of the apparatus in FIG. 15, refer to FIG. 4 and related descriptions of FIG. 4. Details are not described herein again.

Based on a same technical concept, an embodiment of this application further provides a data processing apparatus. The apparatus may execute the method procedure in FIG. 6, and may execute functions implemented by the first access network device in the method procedure in FIG. 7.

Figure 16:
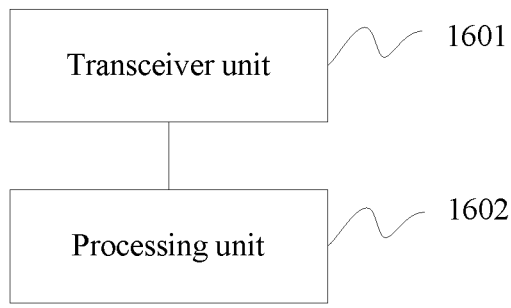
FIG. 16 is a schematic structural diagram of a data processing apparatus according to an embodiment of this application.

As shown in FIG. 16, FIG. 16 is a schematic structural diagram of a data processing apparatus according to an embodiment of this application.

Referring to FIG. 16, the apparatus includes:

a transceiver unit 1601, configured to: send a first message to a second access network device, where the first message is used to request to hand over a terminal to the second access network device; and receive a first response message that includes a first mapping relationship and that is returned by the second access network device, where the first mapping relationship is a mapping relationship between each flow in the terminal and a tunnel endpoint identifier TEID; and a processing unit 1602, configured to forward a data packet of each flow in the terminal to the second access network device based on the first mapping relationship.

For other content of the apparatus in FIG. 16, refer to FIG. 6 and related descriptions of FIG. 6. Details are not described herein again.

Based on a same technical concept, an embodiment of this application further provides a data processing apparatus. The apparatus may execute the method procedure in FIG. 6, and may execute functions implemented by the second access network device in the method procedure in FIG. 7.

Figure 17:
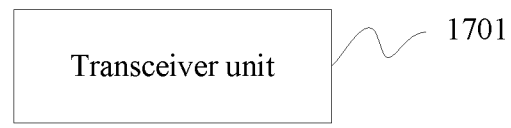
FIG. 17 is a schematic structural diagram of a data processing apparatus according to an embodiment of this application.

As shown in FIG. 17, FIG. 17 is a schematic structural diagram of a data processing apparatus according to an embodiment of this application.

Referring to FIG. 17, the apparatus includes:

a transceiver unit 1701, configured to: receive a first message sent by a first access network device, where the first message is used to request to hand over a terminal to a second access network device; and return a first response message including a first mapping relationship to the first access network device, and receive a data packet that is of each flow in the terminal and that is forwarded by the first access network device based on the first mapping relationship, where the first mapping relationship is a mapping relationship that is between each flow in the terminal and a TEID and that is determined by the second access network device.

For other content of the apparatus in FIG. 17, refer to FIG. 6 and related descriptions of FIG. 6. Details are not described herein again.

Based on a same technical concept, an embodiment of this application further provides a data processing apparatus. The apparatus may execute the method procedure in FIG. 10, and may execute functions implemented by the first access network device in the method procedure in FIG. 11.

Figure 18:
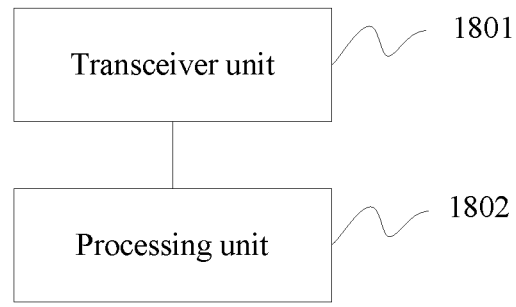
FIG. 18 is a schematic structural diagram of a data processing apparatus according to an embodiment of this application.

As shown in FIG. 18, FIG. 18 is a schematic structural diagram of a data processing apparatus according to an embodiment of this application.

Referring to FIG. 18, the apparatus includes:

a transceiver unit 1801, configured to send a first message to a first core network device, where the first message is used to request to hand over a terminal from a first access network device to a second access network device; and receive a first response message that includes a first mapping relationship and that is returned by the first core network device, where the first mapping relationship is a mapping relationship that is between each RB and a TEID and that is determined by the second access network device for the terminal; and a processing unit 1802, configured to forward a data packet of each RB in the terminal to the second access network device based on the first mapping relationship.

For other content of the apparatus in FIG. 18, refer to FIG. 10 and related descriptions of FIG. 10. Details are not described herein again.

Figure 19:
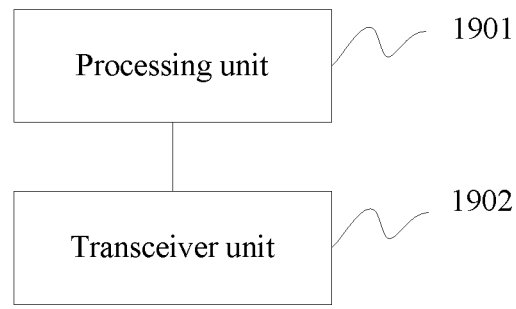
FIG. 19 is a schematic structural diagram of a data processing apparatus according to an embodiment of this application.

As shown in FIG. 19, FIG. 19 is a schematic structural diagram of a data processing apparatus according to an embodiment of this application.

Referring to FIG. 19, the apparatus includes:

a processing unit 1901, configured to determine a second mapping relationship, where the second mapping relationship is a mapping relationship that is between each RB and a flow and that is used by a terminal in a network in which a first access network device is located, and the second mapping relationship is determined based on a TFT template used by each RB in the terminal in a network in which a first core network device is located and a TFT template used by each RB in the terminal in a network in which a second core network device is located; and a transceiver unit 1902, configured to send a third message including the second mapping relationship to a second access network device, where the third message is used to request to hand over the terminal from the first access network device to the second access network device.

For other content of the apparatus in FIG. 19, refer to FIG. 10 and related descriptions of FIG. 10. Details are not described herein again.

Figure 20:
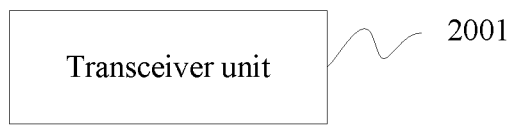
FIG. 20 is a schematic structural diagram of a data processing apparatus according to an embodiment of this application.

As shown in FIG. 20, FIG. 20 is a schematic structural diagram of a data processing apparatus according to an embodiment of this application.

Referring to FIG. 20, the apparatus includes:

a transceiver unit 2001, configured to: receive a third message that includes a second mapping relationship and that is sent by a second core network device, where the third message is used to request to hand over a terminal from a first access network device to a second access network device, and the second mapping relationship is a mapping relationship that is between each RB and a flow and that is used by the terminal in a network in which the first access network device is located; and return a response message including a first mapping relationship to the second core network device, where the first mapping relationship is a mapping relationship that is between each RB and a TEID and that is determined by the second access network device for the terminal.

For other content of the apparatus in FIG. 20, refer to FIG. 10 and related descriptions of FIG. 10. Details are not described herein again.

Figure 21:
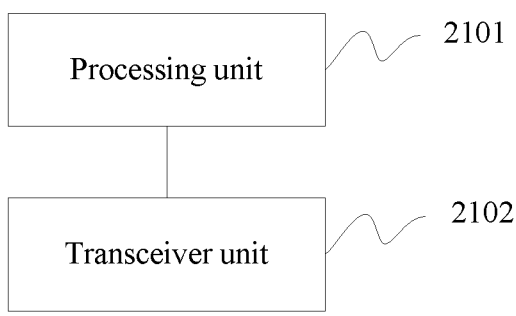
FIG. 21 is a schematic structural diagram of a data processing apparatus according to an embodiment of this application.

As shown in FIG. 21, FIG. 21 is a schematic structural diagram of a data processing apparatus according to an embodiment of this application.

Referring to FIG. 21, the apparatus includes:

a processing unit 2101, configured to allocate an uplink resource to a terminal; and a transceiver unit 2102, configured to send first indication information to the terminal, where the first indication information is used to indicate a transmission success rate of correctly transmitting data on the uplink resource.

For other content of the apparatus in FIG. 21, refer to FIG. 12 and related descriptions of FIG. 12. Details are not described herein again.

Figure 22:
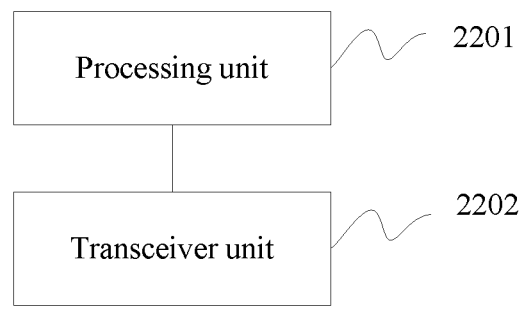
FIG. 22 is a schematic structural diagram of a data processing apparatus according to an embodiment of this application.

As shown in FIG. 22, FIG. 22 is a schematic structural diagram of a data processing apparatus according to an embodiment of this application.

Referring to FIG. 22, the apparatus includes:

a processing unit 2201, configured to: determine an uplink resource allocated by an access network device to a terminal, and receive first indication information sent by the access network device, where the first indication information is used to indicate a transmission success rate of correctly transmitting data on the uplink resource; and a transceiver unit 2202, configured to transmit the data on the uplink resource according to the first indication information.

For other content of the apparatus in FIG. 22, refer to FIG. 12 and related descriptions of FIG. 12. Details are not described herein again.

Based on a same technical concept, an embodiment of this application further provides a data processing apparatus. The apparatus may execute the method procedure in FIG. 1, and may execute functions implemented by the first device in the method procedures in FIG. 2 and FIG. 3.

Figure 23:
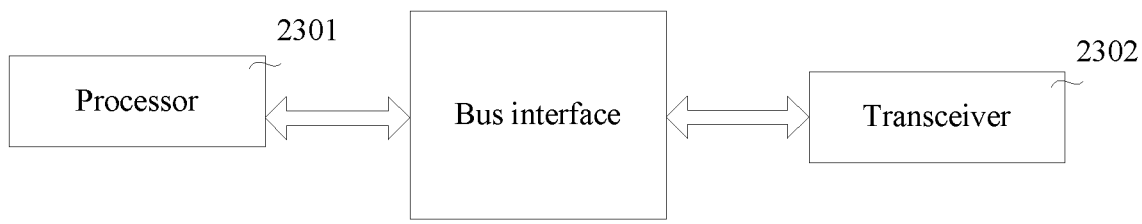
FIG. 23 is a schematic structural diagram of a data processing apparatus according to an embodiment of this application.

As shown in FIG. 23, FIG. 23 is a schematic structural diagram of a data processing apparatus according to an embodiment of this application.

Referring to FIG. 23, the apparatus includes:

a processor 2301, configured to: determine a flow to which a data packet belongs, and determine a flow identifier based on the flow to which the data packet belongs; and a transceiver 2302, configured to send the data packet including the flow identifier to a second access network device.

For other content of the apparatus in FIG. 23, refer to FIG. 1 and related descriptions of FIG. 1. Details are not described herein again.

Based on a same technical concept, an embodiment of this application further provides a data processing apparatus. The apparatus may execute the method procedure in FIG. 4, and may execute functions implemented by the first device in the method procedure in FIG. 5.

Figure 24:
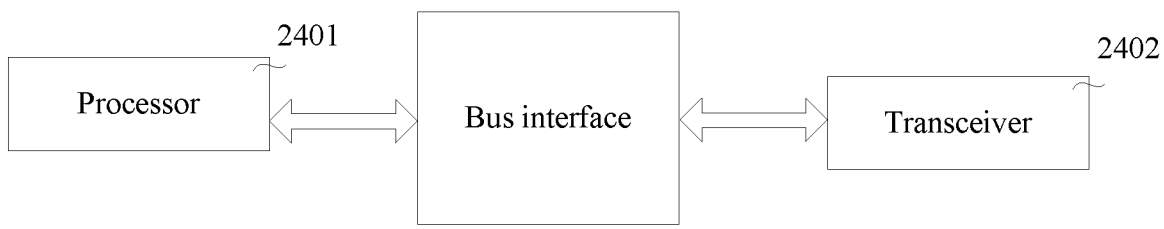
FIG. 24 is a schematic structural diagram of a data processing apparatus according to an embodiment of this application.

As shown in FIG. 24, FIG. 24 is a schematic structural diagram of a data processing apparatus according to an embodiment of this application.

Referring to FIG. 24, the apparatus includes:

a processor 2401, configured to determine an end data packet after a radio bearer RB mapped to which a first flow is mapped changes from a first RB to a second RB, where the end data packet is a last data packet that is of the first flow and that is sent by a first device through the first RB; and a transceiver 2402, configured to send end indication information and the end data packet to a second device, where the end indication information is used to indicate that the first device has completed sending of data packets of the first flow through the first RB.

For other content of the apparatus in FIG. 24, refer to FIG. 4 and related descriptions of FIG. 4. Details are not described herein again.

Based on a same technical concept, an embodiment of this application further provides a data processing apparatus. The apparatus may execute the method procedure in FIG. 4, and may execute functions implemented by the first device in the method procedure in FIG. 5.

Figure 25:
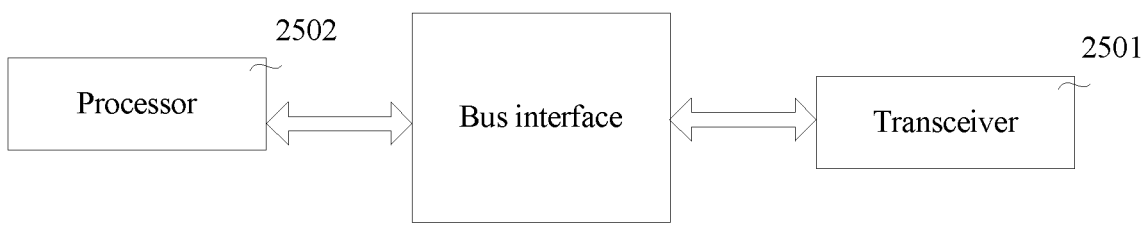
FIG. 25 is a schematic structural diagram of a data processing apparatus according to an embodiment of this application.

As shown in FIG. 25, FIG. 25 is a schematic structural diagram of a data processing apparatus according to an embodiment of this application.

Referring to FIG. 25, the apparatus includes:

a transceiver 2501, configured to receive end indication information sent by a first device, where the end indication information is sent after the first device has completed sending of a last data packet of a first flow through a first radio bearer RB, and the end indication information is used to indicate that the first device has completed sending of data packets of the first flow through the first RB; and a processor 2502, configured to process a data packet that is of the first flow and that is received through the second RB.

For other content of the apparatus in FIG. 25, refer to FIG. 4 and related descriptions of FIG. 4. Details are not described herein again.

Based on a same technical concept, an embodiment of this application further provides a data processing apparatus. The apparatus may execute the method procedure in FIG. 6, and may execute functions implemented by the first access network device in the method procedure in FIG. 7.

Figure 26:
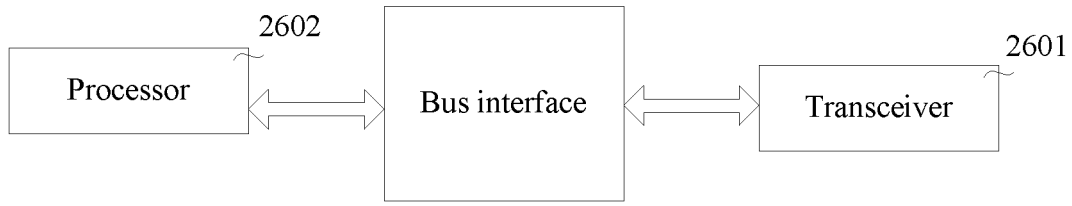
FIG. 26 is a schematic structural diagram of a data processing apparatus according to an embodiment of this application.

As shown in FIG. 26, FIG. 26 is a schematic structural diagram of a data processing apparatus according to an embodiment of this application.

Referring to FIG. 26, the apparatus includes:

a transceiver 2601, configured to: send a first message to a second access network device, where the first message is used to request to hand over a terminal to the second access network device; and receive a first response message that includes a first mapping relationship and that is returned by the second access network device, where the first mapping relationship is a mapping relationship between each flow in the terminal and a tunnel endpoint identifier TEID; and a processor 2602, configured to forward a data packet of each flow in the terminal to the second access network device based on the first mapping relationship.

For other content of the apparatus in FIG. 26, refer to FIG. 6 and related descriptions of FIG. 6. Details are not described herein again.

Based on a same technical concept, an embodiment of this application further provides a data processing apparatus. The apparatus may execute the method procedure in FIG. 6, and may execute functions implemented by the second access network device in the method procedure in FIG. 7.

Figure 27:
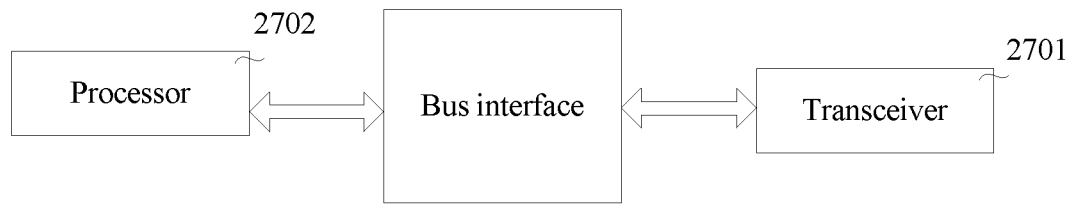
FIG. 27 is a schematic structural diagram of a data processing apparatus according to an embodiment of this application.

As shown in FIG. 27, FIG. 27 is a schematic structural diagram of a data processing apparatus according to an embodiment of this application.

Referring to FIG. 27, the apparatus includes a transceiver 2701 and a processor 2702.

The transceiver 2701 is configured to: receive a first message sent by a first access network device, where the first message is used to request to hand over a terminal to a second access network device; and return a first response message including a first mapping relationship to the first access network device, and receive a data packet that is of each flow in the terminal and that is forwarded by the first access network device based on the first mapping relationship, where the first mapping relationship is a mapping relationship that is between each flow in the terminal and a TEID and that is determined by the second access network device.

For other content of the apparatus in FIG. 27, refer to FIG. 6 and related descriptions of FIG. 6. Details are not described herein again.

Based on a same technical concept, an embodiment of this application further provides a data processing apparatus. The apparatus may execute the method procedure in FIG. 10, and may execute functions implemented by the first access network device in the method procedure in FIG. 11.

Figure 28:
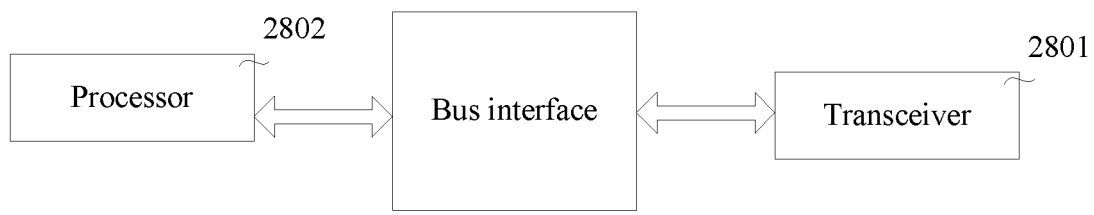
FIG. 28 is a schematic structural diagram of a data processing apparatus according to an embodiment of this application.

As shown in FIG. 28, FIG. 28 is a schematic structural diagram of a data processing apparatus according to an embodiment of this application.

Referring to FIG. 28, the apparatus includes:

a transceiver 2801, configured to send a first message to a first core network device, where the first message is used to request to hand over a terminal from a first access network device to a second access network device; and receive a first response message that includes a first mapping relationship and that is returned by the first core network device, where the first mapping relationship is a mapping relationship that is between each RB and a TEID and that is determined by the second access network device for the terminal; and a processor 2802, configured to forward a data packet of each RB in the terminal to the second access network device based on the first mapping relationship.

For other content of the apparatus in FIG. 28, refer to FIG. 10 and related descriptions of FIG. 10. Details are not described herein again.

Figure 29:
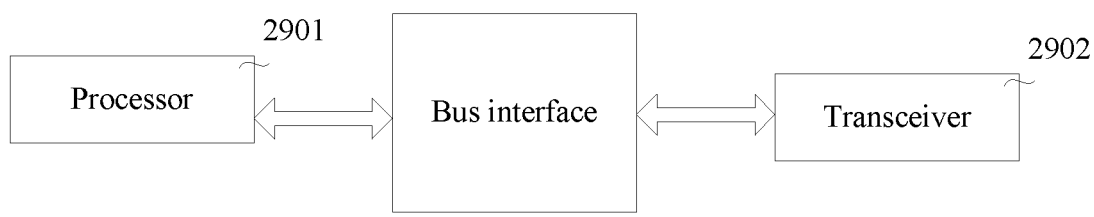
FIG. 29 is a schematic structural diagram of a data processing apparatus according to an embodiment of this application.

As shown in FIG. 29, FIG. 29 is a schematic structural diagram of a data processing apparatus according to an embodiment of this application.

Referring to FIG. 29, the apparatus includes:

a processor 2901, configured to determine a second mapping relationship, where the second mapping relationship is a mapping relationship that is between each RB and a flow and that is used by a terminal in a network in which a first access network device is located, and the second mapping relationship is determined based on a TFT template used by each RB in the terminal in a network in which a first core network device is located and a TFT template used by each RB in the terminal in a network in which a second core network device is located; and a transceiver 2902, configured to send a third message including the second mapping relationship to a second access network device, where the third message is used to request to hand over the terminal from the first access network device to the second access network device.

For other content of the apparatus in FIG. 29, refer to FIG. 10 and related descriptions of FIG. 10. Details are not described herein again.

Figure 30:
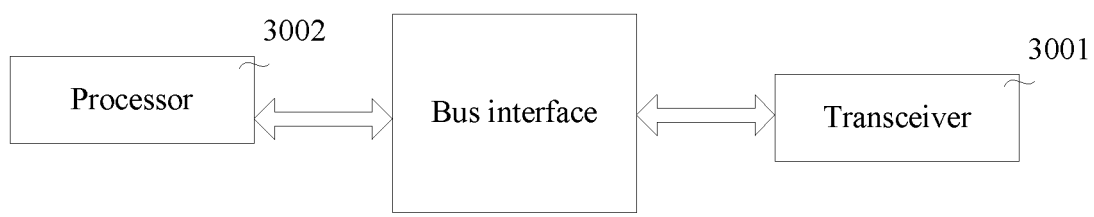
FIG. 30 is a schematic structural diagram of a data processing apparatus according to an embodiment of this application.

As shown in FIG. 30, FIG. 30 is a schematic structural diagram of a data processing apparatus according to an embodiment of this application.

Referring to FIG. 30, the apparatus includes a transceiver 3001 and a processor 3002.

The transceiver 3001 is configured to: receive a third message that includes a second mapping relationship and that is sent by a second core network device, where the third message is used to request to hand over a terminal from a first access network device to a second access network device, and the second mapping relationship is a mapping relationship that is between each RB and a flow and that is used by the terminal in a network in which the first access network device is located; and return a response message including a first mapping relationship to the second core network device, where the first mapping relationship is a mapping relationship that is between each RB and a TEID and that is determined by the second access network device for the terminal.

For other content of the apparatus in FIG. 30, refer to FIG. 10 and related descriptions of FIG. 10. Details are not described herein again.

Figure 31:
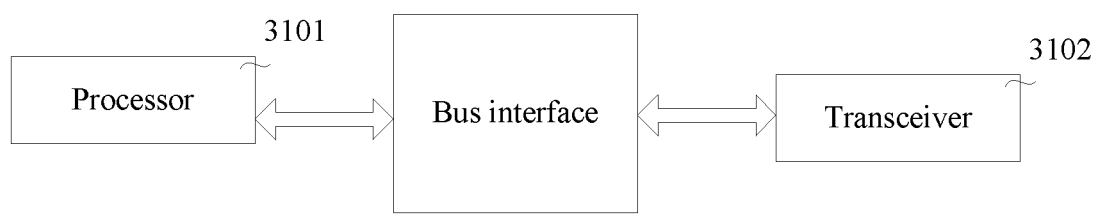
FIG. 31 is a schematic structural diagram of a data processing apparatus according to an embodiment of this application.

As shown in FIG. 31, FIG. 31 is a schematic structural diagram of a data processing apparatus according to an embodiment of this application.

Referring to FIG. 31, the apparatus includes:

a processor 3101, configured to allocate an uplink resource to a terminal; and a transceiver 3102, configured to send first indication information to the terminal, where the first indication information is used to indicate a transmission success rate of correctly transmitting data on the uplink resource.

For other content of the apparatus in FIG. 31, refer to FIG. 12 and related descriptions of FIG. 12. Details are not described herein again.

Figure 32:
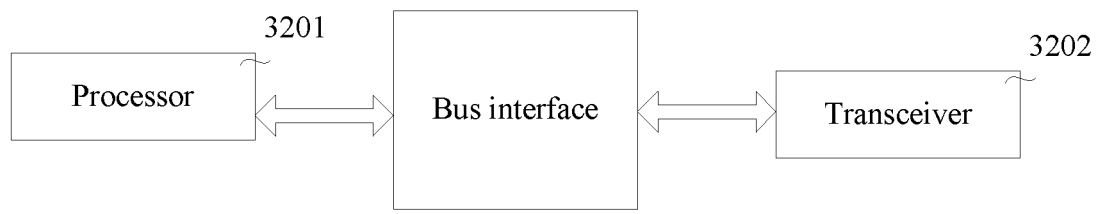
FIG. 32 is a schematic structural diagram of a data processing apparatus according to an embodiment of this application.

As shown in FIG. 32, FIG. 32 is a schematic structural diagram of a data processing apparatus according to an embodiment of this application.

Referring to FIG. 32, the apparatus includes:

a processor 3201, configured to: determine an uplink resource allocated by an access network device to a terminal, and receive first indication information sent by the access network device, where the first indication information is used to indicate a transmission success rate of correctly transmitting data on the uplink resource; and a transceiver 3202, configured to transmit the data on the uplink resource according to the first indication information.

For other content of the apparatus in FIG. 32, refer to FIG. 12 and related descriptions of FIG. 12. Details are not described herein again.

In FIG. 23 to FIG. 32, the transceiver may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor may be a central processing unit (CPU for short), a network processor (NP for short), or a combination of the CPU and the NP. The processor may further include a hardware chip. The hardware chip may be an application-specific integrated circuit (ASIC for short), a programmable logic device (PLD for short), or a combination thereof. The PLD may be a complex programmable logical device (CPLD for short), a field programmable gate array (FPGA for short), generic array logic (GAL for short), or any combination thereof. The memory may include a volatile memory, for example, a random access memory (RAM for short); the memory may include a non-volatile memory, for example, a read-only memory (ROM for short), a flash memory, a hard disk drive (HDD for short), or a solid-state drive (SSD for short); or the memory may include a combination of the foregoing types of memories.

Optionally, a bus interface may further be included in FIG. 23 to FIG. 32, and the bus interface may include any quantity of interconnected buses and bridges, and specifically link various circuits of one or more processors represented by the processor and a memory represented by the memory. The bus interface may further link together various other circuits, such as a peripheral device, a voltage regulator, and a power management circuit. This is well known in the art, and therefore is not further described in this specification. The bus interface provides an interface. The transceiver provides a unit for communicating with various other devices on a transmission medium. The processor is responsible for bus architecture management and general processing. The memory may store data used when the processor performs an operation.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or other programmable device, thereby generating computer-implemented processing. Therefore, the instructions executed on the computer or other programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to this application without departing from the scope of this application. This application is intended to cover these modifications and variations provided that they fall within the scope of protection defined by the following claims.

What is claimed is:

1. A wireless communication method comprising:
   sending, by a user equipment, a first data packet of a first flow and a second data packet of a second flow through a first radio bearer (RB) to an access network device;
   receiving, by the user equipment, a mapping relationship between the first flow and a second RB from the access network device;
   determining, by the user equipment, a change of from mapping the first flow to the first RB to a mapping the first flow to the second RB according to the mapping relationship;
   sending, by the user equipment, end indication information to the access network device through the first RB after determining the change; wherein the end indication information is used to indicate to the access network device that the sending of data packets of the first flow through the first RB has been completed;
   sending, by the user equipment, a third data packet of the first flow through the second RB to the access network device; and
   sending, by the user equipment, a fourth data packet of the second flow through the first RB to the access network device.

2. The method according to claim 1, wherein the sending the end indication information comprises: sending a control packet which comprises the end indication information.

3. The method according to claim 1, further comprising:
   sending an end data packet that is a last data packet of the first flow sent through the first RB.

4. The method according to claim 3, wherein the step of sending end indication information is performed after the end data packet is sent.

5. The method according to claim 1, further comprising:
   sending all unsent data packets of the first flow through the second RB.

6. A wireless communication apparatus, comprising:
   a transceiver, configured to send a first data packet of a first flow and a second data packet of a second flow through a first radio bearer (RB) to an access network device, and receive a mapping relationship between the first flow and a second RB from the access network device;
   a processor, configured to determine a change of from mapping the first flow to the first RB to mapping the first flow to the second RB according to the mapping relationship; and
   the transceiver is further configured to send end indication information to the access network device through the first RB after determining the change; wherein the end indication information is used to indicate to the access network device that the sending of data packets of the first flow through the first RB has been completed;
   the transceiver is further configured to send a third data packet of the first flow through the second RB to the access network device, and send a fourth data packet of the second flow through the first RB to the access network device.

7. The apparatus according to claim 6, wherein the transceiver is configured to send a control packet which comprises the end indication information.

8. The apparatus according to claim 6, wherein the transceiver is further configured to send the end indication information through the first RB.

9. The apparatus according to claim 6, wherein the transceiver is further configured to send an end data packet, wherein the end data packet is a last data packet that is of the first flow and that is sent through the first RB.

10. The apparatus according to claim 9, wherein the transceiver is further configured to send all unsent data packets of the first flow through the second RB.

11. A non-transitory computer-readable medium comprising instructions that, when executed, cause an apparatus to implement a method as following:
    sending, by a user equipment, a first data packet of a first flow and a second data packet of a second flow through a first radio bearer (RB) to an access network device;
    receiving, by the user equipment, a mapping relationship between the first flow and a second RB from the access network device;
    determining, by the user equipment, a change of from mapping the first flow to the first RB to a mapping the first flow to the second RB according to the mapping relationship;
    sending, by the user equipment, end indication information to the access network device through the first RB after determining the change; wherein the end indication information is used to indicate to the access network device that the sending of data packets of the first flow through the first RB has been completed;

sending, by the user equipment, a third data packet of the first flow through the second RB to the access network device; and sending, by the user equipment, a fourth data packet of the second flow through the first RB to the access network device.

12. The medium according to claim 11, wherein the end indication information is comprised in a control packet.

13. The medium according to claim 11, wherein the end indication information is sent through the first RB.

* * * * *

UNITED STATES PATENT AND TRADEMARK OFFICE
CERTIFICATE OF CORRECTION

PATENT NO. : 10,880,773 B2
APPLICATION NO. : 16/277368
DATED : December 29, 2020
INVENTOR(S) : Huang et al.

It is certified that error appears in the above-identified patent and that said Letters Patent is hereby corrected as shown below:

On the Title Page

Item (71), in Column 1, in "Applicant", Line 2, after "LTD.," insert -- Shenzhen, --.

On Page 2, item (56), in Column 2, under "Other Publications", Line 11, delete "·97" and insert -- #97 --, therefor.

In the Specification

In Column 23, Line 23, delete "tunnel" and insert -- tunnel. --, therefor.

In the Claims

In Column 43, in Claim 1, Line 53, delete "to a" and insert -- to --, therefor.

In Column 44, in Claim 11, Line 59, delete "to a" and insert -- to --, therefor.

Signed and Sealed this
Tenth Day of January, 2023

Katherine Kelly Vidal
*Director of the United States Patent and Trademark Office*